(12) United States Patent
Gutierrez-Sheris

(10) Patent No.: US 7,870,065 B2
(45) Date of Patent: Jan. 11, 2011

(54) MONEY-TRANSFER TECHNIQUES

(75) Inventor: Luis Eduardo Gutierrez-Sheris, Ridgewood, NJ (US)

(73) Assignee: Uniteller Financial Services, Inc., Rochelle Park, NJ (US)

( * ) Notice: Subject to any disclaimer, the term of this patent is extended or adjusted under 35 U.S.C. 154(b) by 1742 days.

(21) Appl. No.: 09/829,614

(22) Filed: Apr. 10, 2001

(65) Prior Publication Data

US 2002/0029190 A1 Mar. 7, 2002
US 2008/0033870 A9 Feb. 7, 2008

Related U.S. Application Data

(63) Continuation-in-part of application No. 09/635,330, filed on Aug. 9, 2000, now Pat. No. 7,720,754.

(60) Provisional application No. 60/174,646, filed on Jan. 5, 2000.

(51) Int. Cl.
G06Q 40/00 (2006.01)
(52) U.S. Cl. .............. 705/39; 705/41; 705/42
(58) Field of Classification Search .......... 705/39, 705/41, 42
See application file for complete search history.

(56) References Cited

U.S. PATENT DOCUMENTS

| | | | |
|---|---|---|---|
| 4,625,276 A | 11/1986 | Benton et al. | |
| 4,758,714 A | 7/1988 | Carlson et al. | 235/380 |
| 4,993,068 A | 2/1991 | Piosenka et al. | |
| 4,999,806 A | 3/1991 | Chernow et al. | 364/900 |
| 5,276,311 A | 1/1994 | Hennige | |
| 5,283,829 A | 2/1994 | Anderson | 380/24 |
| 5,408,513 A | 4/1995 | Busch, Jr. et al. | 379/59 |
| 5,448,043 A * | 9/1995 | Nakano et al. | 235/379 |
| 5,513,250 A | 4/1996 | McAllister | 379/91 |
| 5,530,232 A | 6/1996 | Taylor | |
| 5,590,197 A | 12/1996 | Chen et al. | |
| 5,627,355 A | 5/1997 | Rahman et al. | |
| 5,650,604 A | 7/1997 | Marcous et al. | |
| 5,657,388 A | 8/1997 | Weiss | |
| 5,659,165 A * | 8/1997 | Jennings et al. | 235/379 |

(Continued)

FOREIGN PATENT DOCUMENTS

JP 402024762 A 7/1998

(Continued)

OTHER PUBLICATIONS

HIPPA information series, May 2003.

(Continued)

*Primary Examiner*—Jagdish N Patel
*Assistant Examiner*—Kenneth Bartley
(74) *Attorney, Agent, or Firm*—Cowan, Liebowitz & Latman, P.C.; Mark Montague

(57) ABSTRACT

A financial institution has a web-based server for use in transferring money between a customer and a beneficiary. A customer, having a client computer, and a credit card, opens a transaction web page provided by the server. The customer inputs transaction data into the web page, and sends the transaction data to the server via the Internet. The customer then receives a fund-pick-up ("folio") number and provides the beneficiary with the fund-pick-up number to use in collecting the funds.

23 Claims, 18 Drawing Sheets

U.S. PATENT DOCUMENTS

| | | | |
|---|---|---|---|
| 5,677,955 A | 10/1997 | Doggett et al. | |
| 5,704,046 A | 12/1997 | Hogan | |
| 5,739,512 A | 4/1998 | Tognazzini | |
| 5,748,740 A | 5/1998 | Curry et al. | |
| 5,753,899 A | 5/1998 | Gomm et al. | |
| 5,794,207 A * | 8/1998 | Walker et al. | 705/77 |
| 5,796,832 A | 8/1998 | Kawan | |
| 5,799,087 A | 8/1998 | Rosen | 380/24 |
| 5,826,245 A | 10/1998 | Sandberg-Diment | |
| 5,859,419 A | 1/1999 | Wynn | |
| 5,898,154 A | 4/1999 | Rosen | 235/379 |
| 5,903,881 A | 5/1999 | Schrader et al. | 705/42 |
| 5,926,548 A | 7/1999 | Okamoto | |
| 5,936,221 A | 8/1999 | Corder et al. | |
| 5,949,880 A | 9/1999 | Curry et al. | |
| 5,953,710 A | 9/1999 | Fleming | |
| 5,961,593 A | 10/1999 | Gabber et al. | |
| 5,963,647 A | 10/1999 | Downing et al. | |
| 5,988,510 A | 11/1999 | Tuttle et al. | |
| 5,991,748 A | 11/1999 | Taskett | |
| 6,000,832 A | 12/1999 | Franklin et al. | |
| 6,006,200 A | 12/1999 | Boies et al. | |
| 6,012,048 A * | 1/2000 | Gustin et al. | 705/39 |
| 6,012,144 A | 1/2000 | Pickett | |
| 6,016,476 A | 1/2000 | Maes et al. | |
| 6,018,724 A | 1/2000 | Arent | |
| 6,021,202 A | 2/2000 | Anderson et al. | |
| 6,029,887 A | 2/2000 | Furuhashi et al. | |
| 6,032,135 A | 2/2000 | Molano et al. | |
| 6,039,250 A * | 3/2000 | Ito et al. | 235/380 |
| 6,041,314 A | 3/2000 | Davis | |
| 6,049,785 A | 4/2000 | Gifford | |
| 6,073,124 A | 6/2000 | Krishnan et al. | |
| 6,076,075 A | 6/2000 | Teicher | |
| 6,105,008 A | 8/2000 | Davis et al. | |
| 6,129,274 A | 10/2000 | Suzuki | |
| 6,163,771 A | 12/2000 | Walker et al. | |
| 6,189,787 B1 | 2/2001 | Dorf | |
| 6,205,553 B1 | 3/2001 | Stoffel et al. | |
| 6,206,283 B1 * | 3/2001 | Bansal et al. | 235/379 |
| 6,250,557 B1 | 6/2001 | Forslund et al. | |
| 6,282,656 B1 | 8/2001 | Wang | |
| 6,327,363 B1 | 12/2001 | Henderson et al. | |
| 6,394,341 B1 | 5/2002 | Mäkipää et al. | |
| 6,394,343 B1 | 5/2002 | Berg et al. | |
| 6,401,206 B1 | 6/2002 | Khan et al. | |
| 6,422,462 B1 | 7/2002 | Cohen | |
| 6,434,403 B1 | 8/2002 | Ausems et al. | |
| 6,439,456 B1 * | 8/2002 | Bansal et al. | 235/379 |
| 6,470,317 B1 | 10/2002 | Ladd et al. | |
| 6,488,203 B1 | 12/2002 | Stoutenburg et al. | |
| 6,502,747 B1 * | 1/2003 | Stoutenburg et al. | 235/379 |
| 6,554,184 B1 * | 4/2003 | Amos | 235/379 |
| 6,609,113 B1 * | 8/2003 | O'Leary et al. | 705/39 |
| 6,636,833 B1 | 10/2003 | Flitcroft et al. | |
| 6,701,303 B1 | 3/2004 | Dunn et al. | |
| 6,736,314 B2 * | 5/2004 | Cooper et al. | 235/380 |
| 7,058,817 B1 | 6/2006 | Ellmore | |
| 7,072,864 B2 | 7/2006 | Brake, Jr. et al. | |
| 7,120,608 B1 * | 10/2006 | Gallagher et al. | 705/68 |
| 7,155,614 B2 | 12/2006 | Ellmore | |
| 7,177,835 B1 | 2/2007 | Walker et al. | |
| 7,236,950 B2 | 6/2007 | Savage et al. | |
| 7,269,575 B1 * | 9/2007 | Concannon et al. | 705/39 |
| 7,280,645 B1 | 10/2007 | Allen et al. | |
| 2001/0025265 A1 * | 9/2001 | Takayasu | 705/36 |
| 2002/0026394 A1 | 2/2002 | Savage et al. | |
| 2002/0029193 A1 * | 3/2002 | Ranjan et al. | 705/39 |
| 2006/0122931 A1 | 6/2006 | Walker et al. | |
| 2006/0218096 A1 | 9/2006 | Walker et al. | |
| 2006/0218097 A1 | 9/2006 | Walker et al. | |
| 2006/0218098 A1 | 9/2006 | Walker et al. | |

FOREIGN PATENT DOCUMENTS

| | | |
|---|---|---|
| WO | WO 99/18549 | 4/1999 |
| WO | WO 00/63809 | 10/2000 |
| WO | WO 00/67220 | 11/2000 |
| WO | WO 00/75889 | 12/2000 |
| WO | WO01/53971 | 7/2001 |

OTHER PUBLICATIONS

Amazon.com: Safe Ordering, downloaded on Oct. 4, 2000 from http://www.amazon.com/exec/obidos/subst/help/security-guarantee.html/104-5402424-2276726.

Barnes & Noble.com Help Desk, downloaded on Oct. 4, 2000 from http://www.barnesandnoble.com/help/nc_safe_shopping.asp?userid=2UJHVR1I5M.

Barnes & Noble.com Help Desk, downloaded on Oct. 4, 2000 from http://www.barnesandnoble.com/help/po_payment_options.asp?userid=2UJHVR1I5M.

UniTeller Servicio Uniteller, Money Transfer Card, Instructions Manual (copyright 1999, Unisphere Teller).

The above references were cited in an Aug. 7, 2008 US Office that Action issued in related U.S. Appl. No. 10/752,396.

The above reference was cited in a Nov. 10, 2008 US Office Action that issued in related U.S. Appl. No. 09/635,330.

Office action dated Feb. 2, 2010 in related U.S. Appl. No. 10/752,396, which newly cites the above references.

Office action dated Nov. 27, 2009 in U.S. Appl. No. 12/111,550, which newly cites the above references.

Office Action dated Jun. 8, 2010 in related U.S. Appl. No. 12/111,550, which newly cites the above.

The above reference was cited in a Sep. 28, 2010 US Office Action that issued in related U.S. Appl. No. 10/752,396.

* cited by examiner

MONEY-TRANSFER TECHNIQUES

PRIORITY CLAIM

This application is a continuation-in-part of U.S. patent application Ser. No. 09/635,330, filed Aug. 9, 2000, which claims priority to U.S. provisional patent application Ser. No. 60/174,646, filed Jan. 5, 2000, which is incorporated by reference herein.

BACKGROUND OF THE INVENTION

A. Field of the Invention

The present invention relates generally to techniques, specifically apparatus and accompanying methods, of conducting financial transactions, and particularly to commercial systems for transferring money and executing related monetary functions between multiple remotely located parties.

B. Description of the Prior Art

Financial firms have used a variety of processes for transferring money between a customer and a beneficiary. In a typical money transfer process, a customer would visit the facilities of a selling agent who is part of or associated with a financial firm. The customer would normally be asked to complete a form giving information such as the amount to be transferred, and the customer's and beneficiary's names, addresses, telephone numbers, etc. A customer would then submit a completed form to the transfer agent along with a payment, usually in cash, or via a credit card, certified check, or the like. The payment would usually include at least the transfer amount plus a transaction fee. The selling agent would then transmit appropriate information to the facilities of a paying agent where the beneficiary can readily collect the transferred funds.

Those concerned with the development of such processes have long recognized the need for reducing the time and effort required to execute a money transfer, while still maintaining a sufficiently high degree of security from threats, such as fraud, theft, third-party interception with redirection and interference of payment information.

In many prior-art systems, selling agents perform some steps with due speed and security. For instance, once a customer's transaction details and funds are processed, most selling agents can promptly initiate the transaction by electronically transmitting instructions to an appropriate company. Such transmissions normally occur over e.g., a telephone network. Typically, the customer or company would inform the beneficiary, e.g., via a telephone, that the funds are available for delivery at a paying agent's facility. The beneficiary, who, in fact, may have been waiting at a paying agent's facility for the transfer, would present proper identification, e.g., a driver's license, passport, etc., to the paying agent. After reviewing the beneficiary's identification, the paying agent would then make the payment.

Although most prior-art processes can execute a money transfer within a reasonably short time, these processes still require considerable time and effort on the part of the customer and the agents. For instance, most money-transfer processes require that, for every requested transaction, a customer complete long, involved forms that demand considerable time and effort to complete properly. In addition, selling agents must review the customer's forms in detail and then manually input the customer's data for transmission to an appropriate company.

Hence, a need exists in the art for a money transfer system that is significantly easier and quicker to use by both transferring parties and beneficiaries.

SUMMARY OF THE INVENTION

The present invention relates to a method of transferring money from a customer to a beneficiary that advantageously overcomes the deficiencies of conventional money transfer technologies known in the art.

In accordance with the invention, money-transfer devices, specifically transaction cards, are first distributed to a plurality of customers. Each money-transfer device is equipped with a unique device code. Next, a device database is created which comprises a set of device records in which each of the unique device codes is loaded into a different corresponding one of the device records. Customer data, identifying each customer who holds, e.g., a transaction card, (transferring party) along with accompanying beneficiary data, as specified by that customer, is written into the device records associated with the device code of that specific transaction card. Thereafter, the customer actually initiates a transfer of a particular amount of money from that customer to his (her) beneficiary, using, for example, a transaction card.

A more particular aspect of the invention is directed to a technique for transferring money between a customer and a beneficiary via a system comprising a money-transfer company, and a plurality of selling agents and paying agents. The money-transfer company maintains a host computer, a database storage device, and a communications interface for communicating, via a telephone network and/or the Internet, with data terminals or client computers located at the selling and paying agents' sites. Customer transaction cards, distributed to customers by the selling agents, contain a visible card number and an alphanumeric card code stored in a magnetic strip. By customer request, the money-transfer company activates the customer's transaction card and at the same time loads the customer and beneficiary information into a corresponding transaction card record stored in the database storage device. A selling agent initiates a money-transfer request from a data terminal by keying in a money amount and swiping the customer's card in a magnetic strip reader located on the data terminal. Upon receiving the money amount and the customer's card code, the company creates a corresponding transaction record in the database storage device and returns a fund-pick-up number ("folio" number) to the customer. The customer discloses the fund-pick-up number to the beneficiary. Using the fund-pick-up number and appropriate personal identification, the beneficiary collects the transferred money from a paying agent. The customer can subsequently re-use the transaction card to request subsequent money transfers, in any amount, to the same beneficiary, each transfer being accorded a different and unique folio number.

A further aspect of the invention involves a method of transferring a sum of money from a customer to a beneficiary via a money-transfer company, a network of money dispensing machines and a plurality of distributors of money pick-up devices and corresponding personal codes capable of selective operation of the money dispensing machines. The method includes the steps of collecting the sum of money, via the money-transfer company, from a customer for transfer to a beneficiary; providing the beneficiary with a unique device pick-up code; presenting the unique device pick-up code to one of the distributors; activating one of the money pick-up devices and generating a corresponding personal code, via the distributor and the money-transfer company, in response to the step of presenting the unique device pick-up code to one of the distributors; giving the beneficiary an activated one of the money pick-up devices and a corresponding personal code; and operating one of the money dispensing machines to collect the sum of money via the beneficiary using the activated money pick-up device and the corresponding personal code.

Still a further aspect of the invention involves a method of transferring a sum of money from a customer to a beneficiary via a money-transfer company, a network of ATMs (automatic teller machines) and a plurality of distributors of ATM cards and corresponding ATM PINs (personal identification numbers). The money-transfer company collects a sum of money from a customer for transfer to a beneficiary. The beneficiary is provided with a unique pick-up code for getting an activated ATM card and a corresponding PIN from one of the distributors. The beneficiary presents the unique pick-up code to one of the distributors who, in unison with the money-transfer company, activates one of the ATM cards and generates a corresponding PIN. The distributor gives the beneficiary an activated ATM card and a corresponding PIN. Using the activated ATM card and the corresponding PIN, the beneficiary operates one of the ATMs to collect the sum of money.

Yet another aspect of the invention includes a money-transfer system for transferring a sum of money from a customer to a beneficiary. The system includes a network of money dispensing machines capable of dispensing the sum of money in response to operation via a money pick-up device (e.g., an ATM card) and a corresponding personal code (e.g., a PIN). Also included are a plurality of distributors of the money pick-up devices (ATM cards). A money-transfer company collects the sum of money from a customer for transfer to a beneficiary, and provides the beneficiary with a unique device pick-up code for allowing the beneficiary to get an activated money pick-up device from a distributor. The money-transfer company activates the money pick-up device by providing the beneficiary with a personal code corresponding to the money pick-up device and the sum of money. A communication system connects the plurality of distributors to the money-transfer company. The communication system, which may be a PSTN (Public Switched Telephone Network) includes distributor identification apparatus for transmitting a distributor identification signal to the money-transfer company when a distributor initiates communication with the money-transfer company. The distributor identification apparatus may be an ANI (automatic number identification) system for generating an ANI signal to be transmitted as a distributor identification signal to the money-transfer company.

A further aspect of the invention involves a method of transferring a sum of money from a customer to a beneficiary via a money-transfer service and an electronic communication network, e.g., the Internet and the PSTN (Public Switched Telephone Network). A customer accesses the money-transfer service via the electronic communication network, e.g., via the Internet. In response, the money-transfer service transmits a data-input document to the customer. The customer enters transaction data into the data-input document to record the amount of the sum of money to be transferred, an identification of the customer, an identification of the beneficiary, and basic payment data for the money-transfer service to use in collecting the sum of money. Next, the customer transmits the transaction data to the money-transfer service via the electronic communication network, e.g., via the Internet. The money-transfer service collects the sum of money in accordance with the basic payment data. Finally, the customer is provided with a unique fund-pick-up code, which the customer reveals to the beneficiary for collecting the funds.

Still a further aspect of the invention comprises a money-transfer system, for transferring a sum of money from a customer to a beneficiary over an electronic communications network, e.g., the Internet and the PSTN. A money-transfer service connects to the electronic communications network. The money-transfer service includes a document transmission device, e.g., a document server, for transmitting transaction documents to the customers via the electronic communications network, e.g., via the Internet. The money-transfer service also includes a data-record device, e.g., a database storage apparatus, for storing transaction data received via the electronic communications network and generated internally by the money-transfer service. The transaction data includes an amount of money to be transferred, an identification of the customer, an identification of the beneficiary, basic payment data for the money-transfer service to use in collecting the money, and a fund-pick-up code. A plurality of customer communication systems, e.g., client computers and telephones, connects to the electronic communications network. Each of the customer communication systems comprises an access medium, e.g., a browser, for receiving the transaction documents and the fund-pick-up code from the money-transfer service. The customer communication systems also include data-input devices, e.g., a keyboard, a mouse, etc., for inputting transaction data into the transaction documents. In addition, the customer communication systems include transmission devices for transmitting transaction data to the money-transfer service via the electronic communications network, e.g., the Internet. The customer communications systems include apparatus, e.g., telephones, for use in receiving the fund-pick-up code, and for informing the beneficiary of the fund-pick-up code to collect the funds.

BRIEF DESCRIPTION OF THE DRAWINGS

To facilitate understanding, the drawings use identical reference characters, where possible, to designate identical elements common to the figures.

DETAILED DESCRIPTION

In general, the money-transfer techniques, described below in detail, enable remotely located selling and paying agents, associated with a money-transfer company, to transfer money from a customer to a beneficiary. A selling agent inputs an amount to be transferred and a customer's transaction code, stored on a passive magnetic "transaction" card via a data terminal that operates either in a stand-alone environment of a selling agent or in conjunction with a client computer co-located thereat. The transaction code corresponds to customer information and beneficiary information stored by the money-transfer agent (i.e., a financial institution). The customer is given a fund-pick-up code (hereinafter also referred to as a "folio" number), which the customer discloses to the beneficiary for use by the latter for claiming the funds at a paying agent.

Use of a passive transaction card is mainly illustrative. Those skilled in these arts will recognize that the invention is applicable to use with other articles, such as a so-called "smart card", which can be separately coded for a given user and which permits use of encoded security information stored internal to the article and which can be "swiped" through a reader or electronically or optically scanned to initiate a transaction. However, for ease of understanding and simplicity of the following description, the invention will now be described in the context of use with a credit-card type transaction card.

Figure 1:
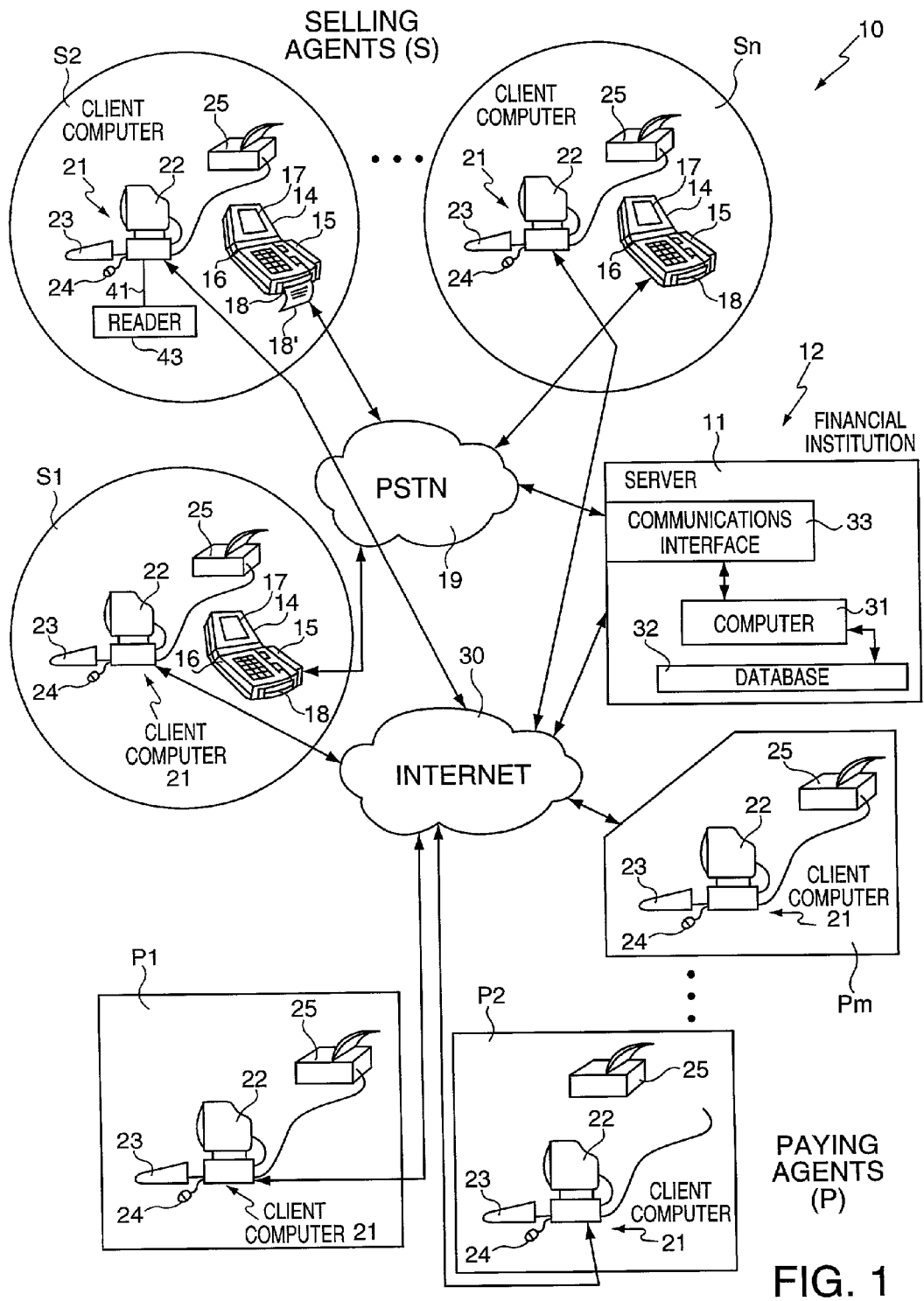
FIG. 1 depicts a high-level schematic diagram of a money-transfer system 10 in accordance with the present invention.

FIG. 1 illustrates money-transfer system 10, money-transfer company 12 (also referred to as a "financial institution"), "n" selling-agent sites S1-Sn and "m" paying-agent sites P1-Pm (where n and m are integers, typically numbering in the thousands, if not larger). Each of the selling-agent sites S1-Sn includes a conventional data transmit-receive (point of sale—POS) terminal 14, which comprises standard magnetic strip ("swipe") card reader 15, keypad 16, printer 18, display 17 and an internal modem (not shown). Sites S1-Sn may also comprise client computer 21, preferably a conventional personal computer (PC), to which associated swipe card reader 43 may also be connected, via connection 41 (for simplicity, the above described connection is shown at only one of the selling agents sites, e.g., site S2). The POS terminals and client computers (with or without swipe card readers) are typically stand-alone devices. Client computer 21 includes display 22, keyboard 23, mouse 24 and printer 25. Paying-agent sites P1-Pm also include client computer 21 having display 22, keyboard 23, mouse 24 and printer 25. Client computers 21 connect to Internet 30 through conventional communications equipment (not specifically shown). Terminals 14 connect to server 11 via PSTN (Public Switched Telephone Network) 19. As described below, transactions involving any agent can occur either over the PSTN or through a web-based Internet connection, depending upon the communication facilities available at that agent. For simplicity, we will assume that selling agents utilize either a telephone and/or web-based connection, while paying agents utilize the latter.

Figure 2:
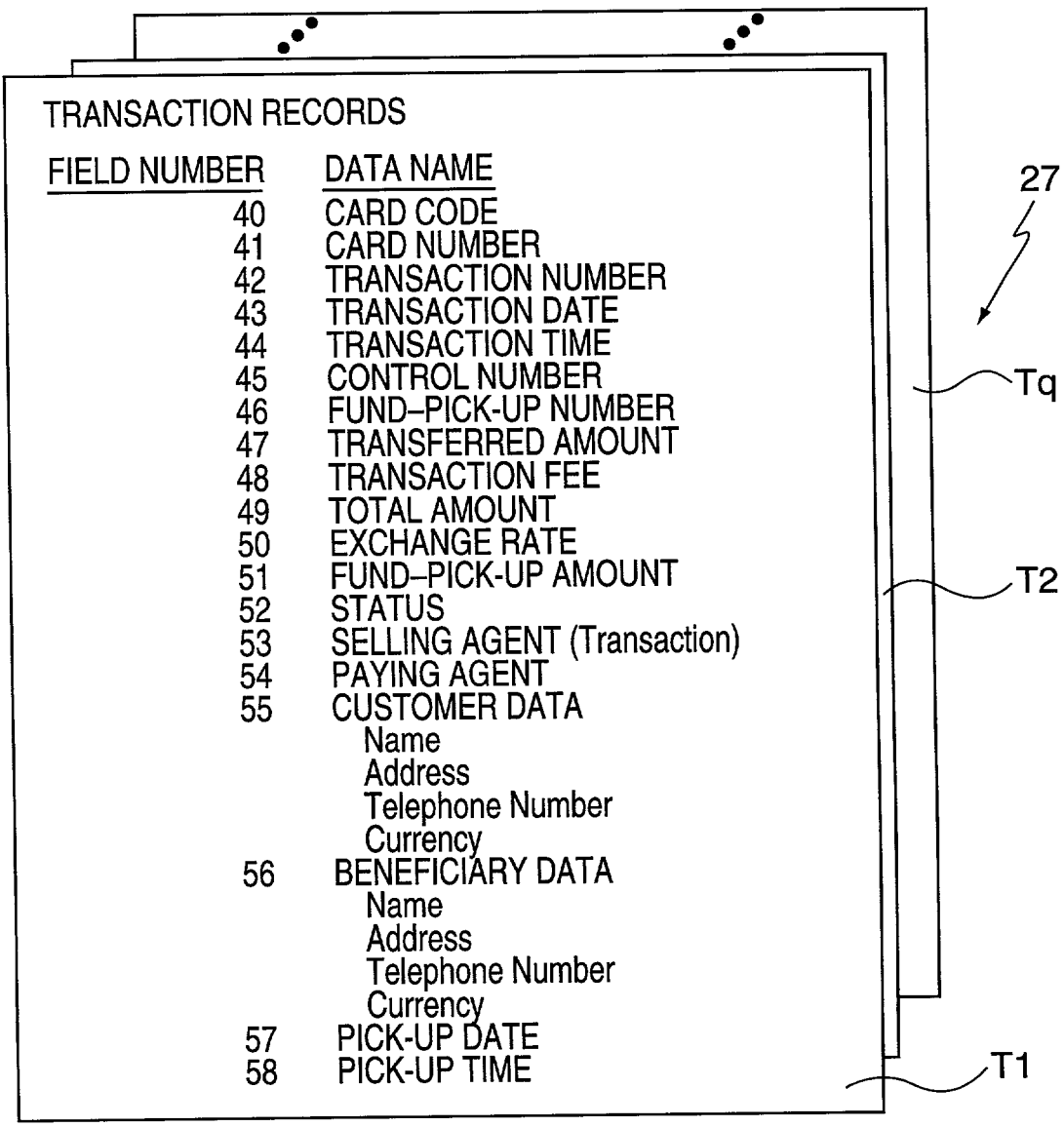
FIG. 2 schematically illustrates transaction data 27 stored as a set of transaction records T1-Tq for use in the system of FIG. 1.
Figure 3:
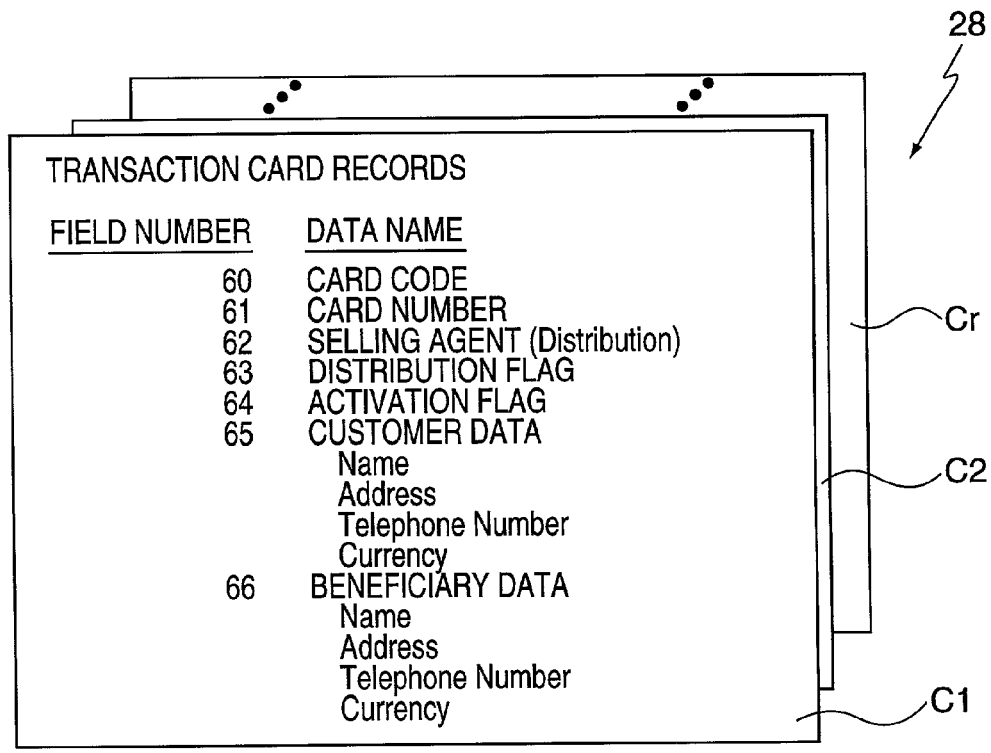
FIG. 3 schematically illustrates transaction card data 28 as a set of transaction card records C1-Cr for use in the system of FIG. 1.

Server 11 (which is described in greater detail below in conjunction with FIGS. 10-12), located at the facilities of financial institution 12, comprises computer 31, database 32 and communications interface 33. Server 11 connects to PSTN 19 and Internet 30 via communications interface 33. Communications interface 33, which is conventional, provides server 11 with a standard modem connection to PSTN 19 and generally a full-time dedicated connection to Internet 30. Database 32 stores money-transfer data, including transaction data 27 and transaction card data 28 as illustrated in FIGS. 2 and 3, respectively. Transaction data 27 comprise a set of "q" transaction records T1-Tq. Transaction card data 28 comprise a set of "r" transaction card records C1-Cr.

As shown in FIG. 2, the transaction records T1-Tq comprise the following data in the indicated data fields shown in Table 1 as follows.

Field 40—CARD CODE
Field 41—CARD NUMBER
Field 42—TRANSACTION NUMBER
Field 43—TRANSACTION DATE
Field 44—TRANSACTION TIME
Field 45—CONTROL NUMBER
Field 46—FUND-PICK-UP NUMBER
Field 47—TRANSFERRED AMOUNT
Field 48—TRANSACTION FEE
Field 49—TOTAL AMOUNT
Field 50—EXCHANGE RATE
Field 51—FUND-PICK-UP AMOUNT
Field 52—STATUS
Field 53—SELLING AGENT
Field 54—PAYING AGENT
Field 55—CUSTOMER'S Name, Address, Telephone Number and Currency
Field 56—BENEFICIARY'S Name, Address, Telephone Number and Currency
Field 57—PICK-UP DATE
Field 58—PICK-UP TIME Table 1—Transaction Record Fields With reference to FIG. 3, the transaction card records C1-Cr comprise the following data in the data fields shown in Table 2 as follows.

Field 60—CARD CODE
Field 61—CARD NUMBER
Field 62—SELLING AGENT (Distribution)
Field 63—DISTRIBUTION FLAG
Field 64—ACTIVATION FLAG
Field 65—CUSTOMER'S Name, Address, Telephone Number and Currency
Field 66—BENEFICIARY'S Name, Address, Telephone Number and Currency Table 2—Transaction Card Records Field Server 11 initially creates transaction card records C1-Cr by loading a specific CARD CODE and CARD NUMBER into respective fields 60 and 61. In addition, DISTRIBUTION FLAG (field 63) and ACTIVATION FLAG (field 64) are initially reset to indicate that the corresponding transaction card 95 is a non-distributed, non-activated card.

Figure 4:
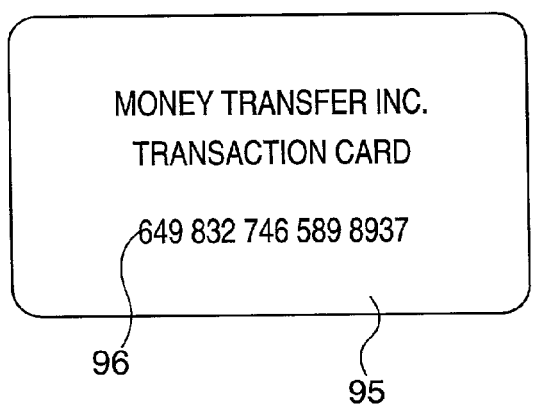
FIG. 4 depicts a front view of transaction card 95 for use with system 10 shown in FIG. 1.
Figure 5:
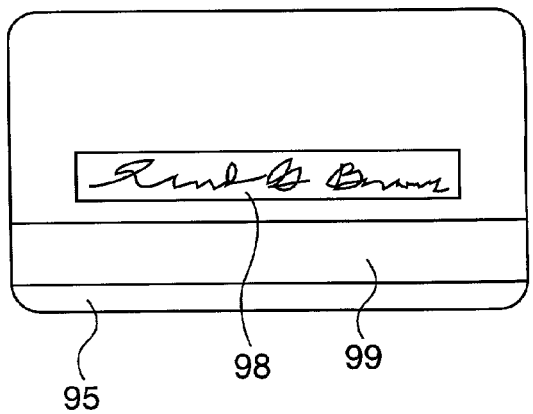
FIG. 5 depicts a rear view of transaction card 95 illustrated in FIG. 4.

As will become clear from the following description and with reference to FIGS. 4 and 5, each of the transaction card records C1-Cn corresponds to a unique transaction card 95. In addition, each of the transaction records T1-Tq (also referred to as a "folio") is associated on a 1:1 basis with only one of the transaction card records C1-Cn. However, transaction card records C1-Cn can be associated (on a k:1 basis where k≧1) with any number of transaction records T1-Tq.

Figure 6:
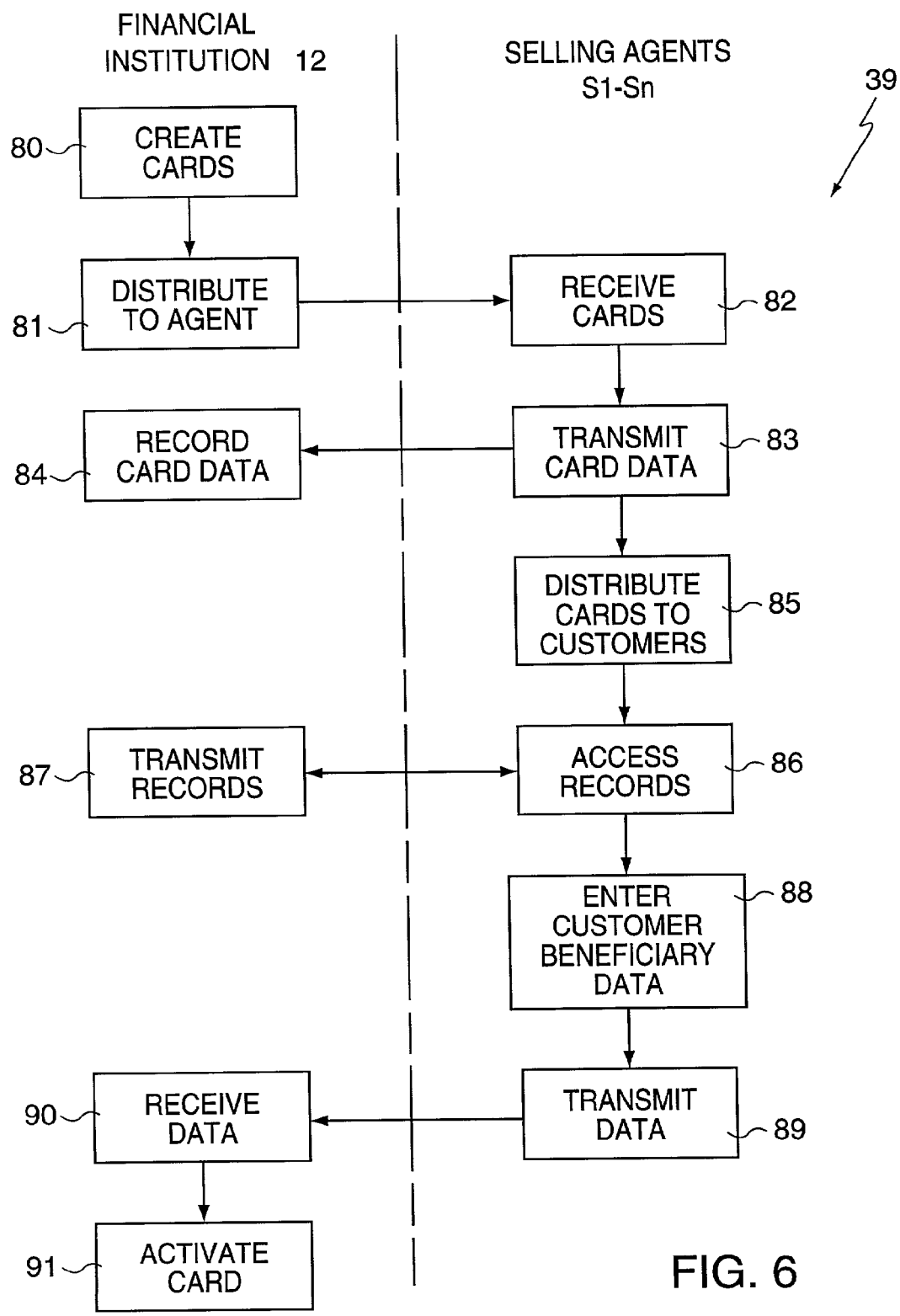
FIG. 6 depicts a flow diagram illustrating a card distribution and activation process 39 which embodies the teachings of the present invention.

FIG. 6 illustrates transaction card distribution and activation process 39. Financial institution 12 performs a portion of this process (shown in the left side of this figure). The remainder of process 39 (shown in the right side of this figure) is performed by each of the selling agents S1, . . . , Sn, at its respective site.

Transaction card distribution and activation process 39 begins with acquire-cards step 80. Through step 80, institution 12 acquires, from a card manufacturer or the like, a number of "generic" transaction cards 95 (see FIGS. 4 and 5) (i.e., "generic" in the sense of not having any customer records or beneficiary data associated therewith). Transaction cards 95 are preferably durable plastic cards similar, in size, shape and configuration, to a conventional credit card. Each such transaction card is stamped (typically embossed) with card number 96 (see FIG. 4), visible from the card front and corresponding to a CARD NUMBER (field 61) (see FIG. 3). The back of transaction card 95 includes conventional signature strip 98 and magnetic strip 99. Magnetic strip 99 is encoded with a unique alphanumeric card code corresponding to a CARD CODE (field 60) (see FIG. 3).

Server 11, at institution 12, initially loads each card number 96 into CARD NUMBER (field 61) and each corresponding magnetically stored card code into CARD CODE (field 60). This can done, most likely, through computer download of the information from, e.g., a card supplier (such as the card manufacturer) to the financial institution at the time a batch of cards is manufactured, by supplying a magnetic tape or diskette (or other media) containing that information for subsequent download by the institution once the cards are delivered to it, or subsequently when the cards are distributed by the selling agents to their respective customers. In addition, for each card 95, computer 31 resets DISTRIBUTION FLAG (field 63), indicating that a selling-agent has not yet received the corresponding transaction card or, in the case of a transaction card record being instantiated when that card is distributed to its customer, the distribution flag is set at the time that record is created. Further, host computer 31 resets ACTIVATION FLAG (field 64), indicating that the corresponding card 95 is a non-activated card.

In distribute-to-agent step 81, institution 12 distributes non-activated transaction cards 95 to a number of selling agent sites S1-Sn. Selling agents distribute one or more non-activated transaction cards 95 to customers, in distribute-to-customer step 85. Since these cards are not activated, the selling agents do not need to distribute the cards in a secure manner.

After receiving cards 95, in step 82, the selling agents transmit card data for each card 95 to server 11, via transmit step 83. Specifically, a selling agent enters the selling agent's ID, via keypad 16, and simply swipes each card 95 through a magnetic strip reader 15 on terminal 14 at the time the cards have been distributed to their respective customers (users). Terminal 14 transmits a card code and the selling agent's ID to server 11, via PSTN 19. For those agents that have Internet access and also a swipe card reader, the information provided by the swipe reader can be routed through the client computer to appropriately populate an "activation" web page provided by a transaction server at institution 12 and then send the data on the populated page to that server for use in updating database 32. In any event, through record-data step 84, server 11 receives the card data and accesses the card record, from card records C1-Cr previously stored in database 32, that corresponds to the received card code. For the retrieved card record, server 11 sets DISTRIBUTION FLAG (field 63), indicating that a customer has received the corresponding transaction card, and loads the selling agent's ID into SELLING AGENT field (field 62).

When a customer first receives a transaction card, that card already has a corresponding record established in database 32. However, the customer cannot use the transaction card 95 until the corresponding card record C1-Cr indicates that the card is activated. Server 11 activates card 95 by setting the corresponding ACTIVATION FLAG (field 64). In addition, the record must also contain customer and beneficiary information as CUSTOMER DATA (fields 65) and BENEFICIARY DATA (field 66).

A selling agent requests activation of a transaction card 95 via his or her client computer 21 and Internet 30. To do so, that selling agent begins by establishing an internet connection, through a web browser, to a web site maintained by institution 12, which provides a transaction card activation web page for display at a browser executing at the agent's client PC. The agent then accesses, through the site, a record of a card based on the unique card number associated with that card, from database 32, in access-records step 86 via server 11. Using client computer 21, the selling agent enters a transaction card number 96 provided by a customer into the page and sends, via step 87, an HTTP (Hypertext Transfer Protocol) request containing this number, to the web server. In response, a copy of the appropriate record, say transaction card record C1, is transmitted also, in transmit-record step 87 but by the server, as an HTML file. This file is then locally displayed, via the agent's browser, as a web page, on the selling agent's monitor 22. Using the selling agent's keyboard 23 and mouse 24, the selling agent, in enter-data step 88, enters customer and beneficiary data into the web page then displayed on monitor 22. Specifically, the customer's name, address, telephone number and currency (e.g., U.S. Dollars) are entered into appropriate locations in the page. In addition, the selling agent enters the beneficiary's name, address, telephone number and currency (e.g., Mexican Pesos). After entering all of the necessary data, the selling agent transmits, in transmit-data step 89, the resulting page through the browser, as an HTTP request, to server 11 (see FIG. 1) at institution 12. This page includes an instruction issued by the agent through depression of or clicking on an associated "button" or other user-activated hypertext field (commonly called a "widget") displayed on that page to activate the corresponding transaction card.

Server 11 receives the HTTP request, in receive-data step 90 (see FIG. 6), and through activate-card step 91, activates the appropriate card record, e.g., transaction card record C1. Specifically, server 11 sets an ACTIVATION FLAG (field 64), and loads the customer's and beneficiary's names, addresses, telephone numbers and currencies in the respective fields 65 and 66.

Thus, at this stage, the transaction card record, e.g., transaction card record C1, which corresponds to the customer's transaction card 95, holds a set of parameters that defines, except for the transaction amount, a unique transaction between a particular customer and a particular beneficiary. Consequently, a selling agent can initiate a money transfer by simply entering a selling agent ID and a transaction amount, via keypad 16, and then swiping the customer's card 95 in magnetic strip reader 15.

Figure 7:
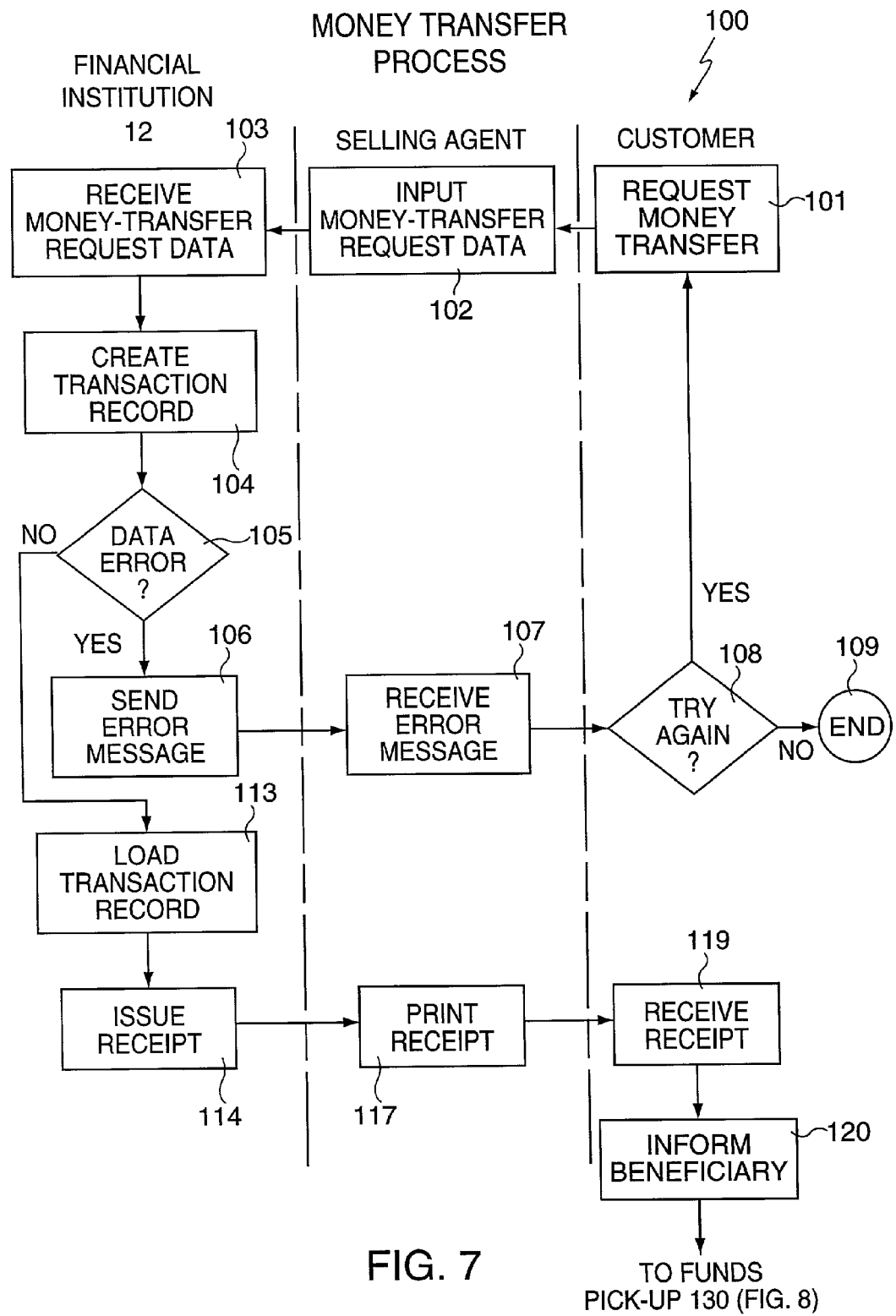
FIG. 7 depicts a flow diagram illustrating money-transfer process 100 in accordance with the present invention.

FIG. 7 depicts money-transfer process 100. Institution 12 performs a portion of this process (shown in the left side of this figure), while the selling agents, S1-Sn, performs the steps located in the center of FIG. 7. Finally, the customers wishing to transfer money to a beneficiary perform the steps located in the right side of FIG. 7.

Money-transfer process 100 commences with customer-request step 101. In step 101, a customer with a previously activated transaction card 95 visits a selling agent's site, e.g., site S2, to arrange a money transfer to a beneficiary. The customer presents a transaction card 95 to the selling agent and pays the selling agent an amount that includes the amount to be transferred and a transaction fee.

In input-data step 102, a selling agent enters money-transfer request data via keypad 16 and magnetic strip reader 15 on terminal 14. Specifically, the selling agent keys in its selling agent ID and a transaction amount via keypad 16, and then swipes transaction card 95 through magnetic strip reader 15 to enter the card code of that card. In input-data step 102, terminal 14 transmits the selling agent's ID, the amount and the card code to server 11 via PSTN 19 (or, as discussed above, through an appropriate web page provided by server 11 through an Internet connection).

Upon receiving the transaction request, in receive-data step 103, server 11 creates one of the transaction records T1-Tq, e.g., transaction record T1. Thus, in create-record step 104, server 11 begins by creating unique transaction and control numbers. Server 11 then enters the transaction number into TRANSACTION NUMBER (field 42), the control number into CONTROL NUMBER (field 45), the card code into CARD CODE (field 40), and the selling agent's ID into SELLING AGENT (field 53). In addition, server 11 enters a transaction status code, e.g., "OPEN", into STATUS (field 52), to indicate that the corresponding transaction is an open transaction. Further in create-record step 104, using the card code received in step 103, server 11 searches transaction card records C1-Cr for a card record with a matching CARD CODE (field 60).

Upon finding a match, server 11 copies data from the matching transaction card record, e.g., record C1, to the transaction record being created, e.g., record T1. Specifically, server 11 copies CARD NUMBER from field 61 to field 41, CUSTOMER DATA from field 65 to field 55 and BENEFICIARY DATA from field 66 to field 56. Next, computer 31 calculates and enters TRANSACTION FEE (field 48), TRANSFERRED AMOUNT (field 47), FUND-PICK-UP AMOUNT (field 51), using, if necessary, EXCHANGE RATE (field 50), and TOTAL AMOUNT (field 49). Finally, server 11 enters TRANSACTION DATE (field 43) and TRANSACTION TIME (field 44) with the current date and time. Computer 31 leaves blank the PAYING AGENT (field 54), PICK-UP DATE (field 57) and PICK-UP TIME (field 58), which are filled in when the beneficiary picks up the funds.

If no match occurs or a data error results during execution of create-record step 104, as determined in decision step 105, server 11 returns an error message to the selling agent in send error message step 106. The selling agent receives the error message, in receive-error message step 107, for display on display 17 (if the terminal is being used) and/or as an HTML file rendered by the browser executing at client computer 21 (if web access is being used). In those instances where the customer wishes to try again, the process exits the YES path of decision step 108 and returns to request step 101. Otherwise, the process terminates via a NO path of decision step 108 to end step 109.

If no data errors occurred, then process 100 advances, via a YES path of decision step 105, to load-record step 113. In load-record step 113, server 11 loads the transaction record created in create-record step 104, e.g., transaction record T1, into database 32. Next, in issue-receipt step 114, server 11 issues a money-transfer receipt in the form of a data transmission to the selling agent at, for example, selling-agent site S2. Upon receiving the money-transfer receipt data, the selling agent's terminal 14 prints a transaction receipt via terminal printer 18. In this regard, FIG. 1 shows printer 18 at selling-agent site S2 printing a transaction receipt in the form of printed slip 18'. Printer 18 prints at least two copies of the transaction receipt (printed slip 18'), which the customer signs. The selling agent retains a copy, while giving the customer a copy, in receive-receipt step 119.

A preferred transaction receipt contains the following information, as shown in Table 3 below:

FINANCIAL INSTITUTION'S
   NAME, ADDRESS AND TELEPHONE NUMBER
SELLING AGENT'S
   NAME, ADDRESS AND TELEPHONE NUMBER
CARD NUMBER
TRANSACTION NUMBER
TRANSACTION DATE
TRANSACTION TIME
CONTROL NUMBER
FUND-PICK-UP
IN CUSTOMER CURRENCY (e.g., US Dollars):
   TRANSACTION AMOUNT
   TRANSACTION FEE
   TOTAL AMOUNT
IN BENEFICIARY CURRENCY (e.g., Mexican Pesos):
   FUND-PICK-UP AMOUNT
EXCHANGE RATE
CUSTOMER'S
   NAME, ADDRESS AND TELEPHONE NUMBER
BENEFICIARY'S
   NAME, ADDRESS AND TELEPHONE NUMBER
CUSTOMER'S SIGNATURE Table 3—Transaction Receipt Upon receiving the transaction receipt in receive-receipt step 119, the customer contacts the beneficiary in inform-beneficiary step 120. The customer informs the beneficiary of the fund-pick-up ("folio") number and amount, by, for example, a telephone call, an e-mail message, or a facsimile transmission.

Figure 8:
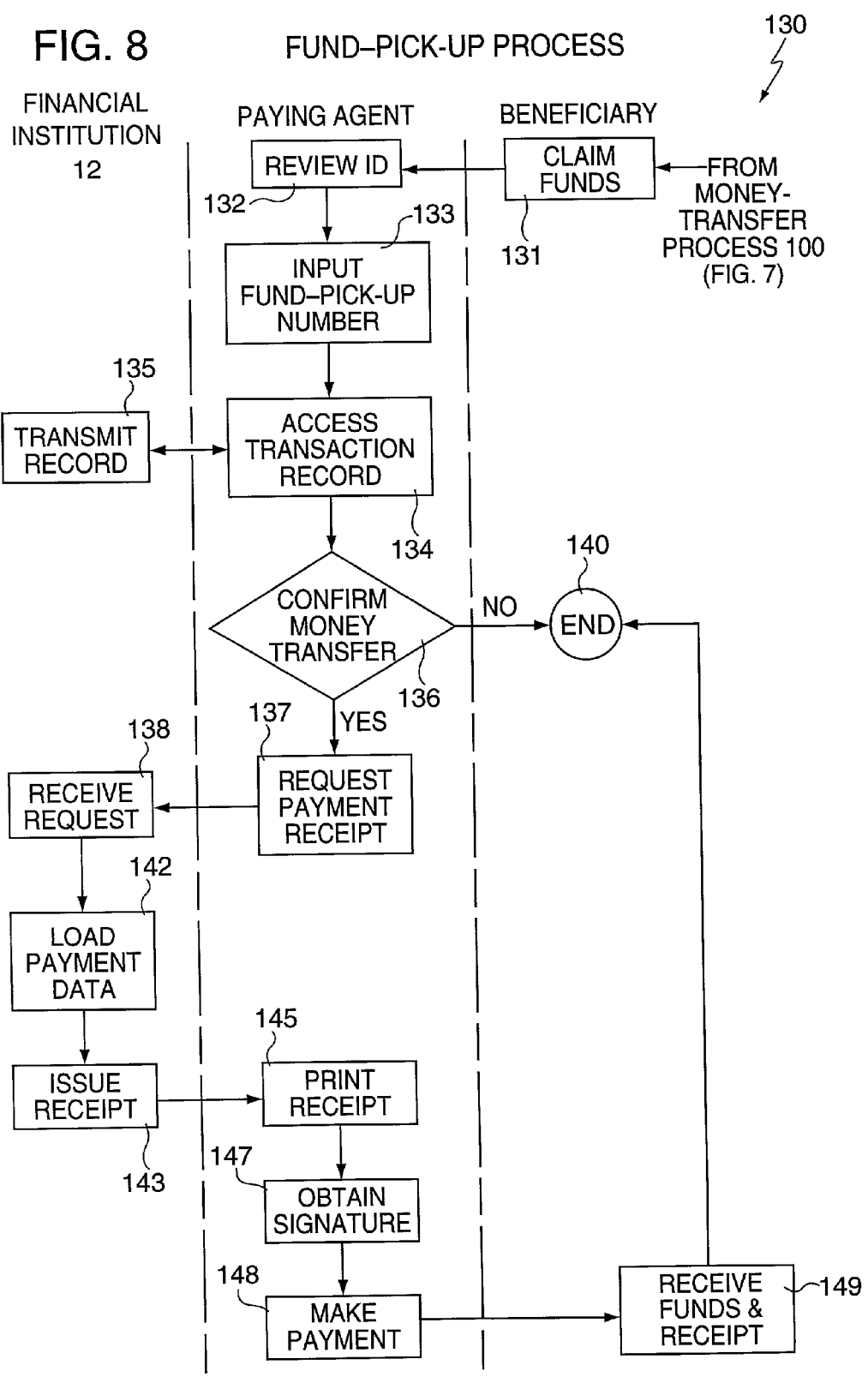
FIG. 8 depicts a flow diagram illustrating fund-pick-up process 130 in accordance with the present invention.

FIG. 8 illustrates fund-pick-up process 130. Institution 12 performs the steps located in the left side of FIG. 8, while each of the paying agents, at P1-Pm, performs the steps located in the center of FIG. 8. Finally, the beneficiary performs the steps located in the right side of FIG. 8.

In claim-funds step 131, a beneficiary claims funds from a paying agent by presenting a folio number and proper personal identification, preferably a photo ID such as a driver's license, passport, etc. After reviewing the customer's identification, in review-ID step 132, the paying agent uses the folio number to access a copy of the corresponding transaction record, e.g., transaction record T1, from institution 12. Specifically, using Internet 30 and the paying agent's client computer 21, in input step 133, the paying agent establishes an Internet connection to server 11 to obtain a "payment" page. Through this page, the agent enters the folio number that the beneficiary provided.

The paying agent transmits, through its browser and as an HTTP request, the request in access-record step 134. Server 11 responds, via Internet 30, in transmit-record step 135 with a web page providing payment authorization, including the amount to be paid and the currency in which payment is to be made, and the name and address of the beneficiary to whom this amount is to be paid. Specifically, a web page containing a copy of the data stored in the corresponding transaction record is displayed on the paying agent's monitor 22. The paying agent, in decision step 136, confirms the validity of the money transfer using the beneficiary's identification and transaction data 27 displayed on monitor 22. If the beneficiary's identification matches the displayed transaction data 27 for the corresponding transaction record, e.g., transaction record T1, the paying agent authorizes payment of the amount displayed in FUND-PICK-UP AMOUNT (field 51).

Upon authorizing payment, the paying agent requests, by clicking or depressing an appropriate widget on the payment page, that server 11 issue a payment receipt, in request-receipt step 137. If the paying agent finds that the beneficiary's identification does not match the transaction data 27, in decision step 136, the paying agent refuses the payment and so informs the beneficiary. Process 130 then ends through step 140.

After receiving a request for a payment receipt, in receive-request step 138, server 11 loads payment data into the corresponding transaction record, here transaction record T1, in load-data step 142 in database 32 to effectively "close-out" the transaction. Specifically, server 11 enters a payment code, e.g., "PAID", into STATUS (field 52), indicating that the funds were paid. In addition, server 11 enters a date into PICK-UP DATE (field 57), a time into PICK-UP TIME field (field 58) and a paying agent's ID into PAYING AGENT field (field 54).

Server 11 next issues a payment receipt, in Issue-receipt step 143. In particular, server 11 transmits the following data (listed in table 4 below) in the form of a displayed web page, which, through the agent's browser, is displayed on the paying agent's monitor 22.

FINANCIAL INSTITUTION'S
   NAME, ADDRESS AND TELEPHONE NUMBER
PAYING AGENT'S
   NAME, ADDRESS AND TELEPHONE NUMBER
PICK-UP DATE
PICK-UP TIME
CONTROL NUMBER
FUND-PICK-UP
CUSTOMER'S
   NAME, ADDRESS AND TELEPHONE NUMBER
BENEFICIARY'S
   NAME, ADDRESS AND TELEPHONE NUMBER
IN CUSTOMER CURRENCY (e.g., US Dollars):
   TRANSACTION AMOUNT
   TRANSACTION FEE
   TOTAL AMOUNT
IN BENEFICIARY CURRENCY (e.g., Mexican Pesos):
   FUND-PICK-UP AMOUNT
   EXCHANGE RATE
BENEFICIARY'S SIGNATURE
Table 4—Displayed Payment Data Using printer 25, in print-receipt step 145, the paying agent prints two copies of the payment receipt, which the beneficiary signs, in obtain-signature step 147. In make-payment step 148, the paying agent gives the beneficiary the transferred amount of money along with one copy of the payment receipt. After the beneficiary receives the funds and the receipt, in receive-funds step 149, fund-pick-up process 130 ends in step 140.

The selling agents preferably deposit the funds they collect into a specified bank account for transmission to financial institution 12. In turn, the institution typically distributes funds to the paying agents by, for example, crediting an account or issuing a check. Of course, the invention contemplates that numerous procedures are available for clearing accounts, i.e., for collecting funds from and paying funds to the paying and selling agents.

In those instances where a beneficiary fails to collect funds within a particular time, e.g., thirty days, server 11 is programmed to automatically cancel the transaction. For instance, the server cancels the transaction, by, for example, changing the contents of the STATUS field (field 52) from "OPEN" to "EXPIRED". At that time, institution 12 informs the customer, via mail or telephone, that the beneficiary failed to pick-up the funds and that the transaction expired. In addition, at that time, arrangements may be made to, e.g., issue a refund to the customer.

Figure 9:
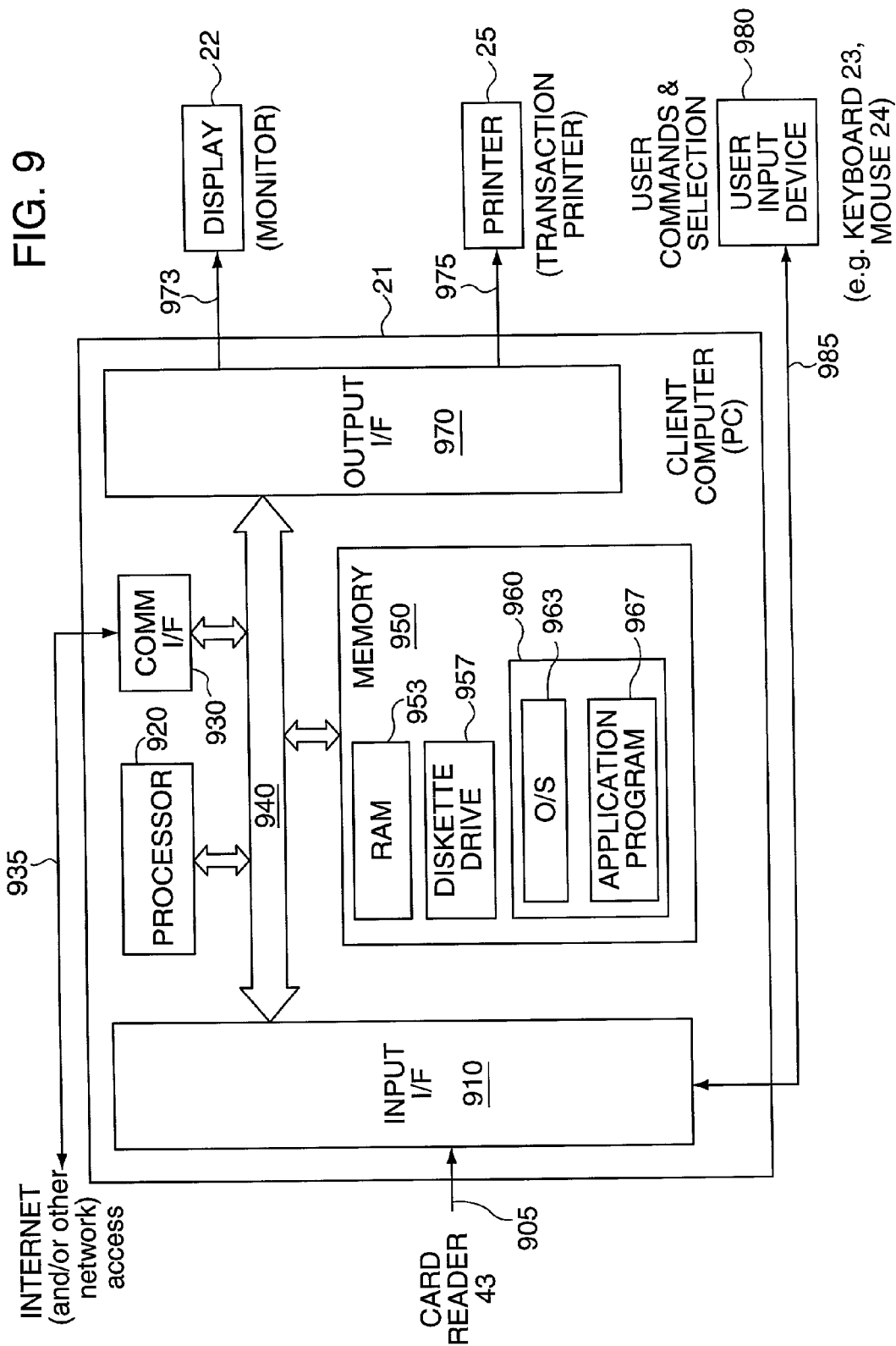
FIG. 9 depicts a high-level block diagram of illustrative client computer 21 located at either a selling or paying agent.

FIG. 9 depicts a block diagram of client computer (PC) 21 located at either a selling or paying agent, and which is used in implementing the present invention.

As shown, client computer 21 comprises input interfaces (I/F) 910, processor 920, communications interface (COMM I/F) 930, memory 950 and output interfaces 970, all conventionally interconnected by bus 940. Memory 950, which generally includes different modalities, including illustratively random access memory (RAM) 953 for temporary data and instruction store, diskette drive(s) 957 for exchanging information, as per user command, with floppy diskettes, and non-volatile mass store 960 that is implemented through a hard disk, typically magnetic in nature. Mass store 960 may also contain a CD-ROM or other optical media reader (not specifically shown) (or writer) to read information from (and write information onto) suitable optical storage media. The mass store stores operating system (O/S) 963 and application program 967; the latter implementing client processing used in the present invention. O/S 963 may be implemented by any conventional operating system, such as the WINDOWS NT operating system ("WINDOWS NT" is a registered trademark of Microsoft Corporation of Redmond, Wash.). Given that, we will not discuss any components of O/S 963 as they are all irrelevant. Suffice it to say, application program 967 executes under control of the O/S.

Incoming information can arise from two illustrative external sources: network supplied information, e.g., from Internet 30 and/or other packet networked facility, through network connection 935 to communications interface 930, or from a dedicated input source, via path(es) 905, to input interfaces 910. Here, dedicated input can arise from swipe card reader 43, in those agent sites that employ both that reader and a client computer for accessing server 11 (see FIG. 1) through an Internet connection.

Input interfaces 910 contain appropriate circuitry to provide necessary and corresponding electrical connections required to physically connect and interface card reader 43 (as well as any other dedicated input devices, not shown) to client computer 21. Under control of the operating system, application program 967 may exchange commands and data, via network connection 935 to server 11, or path(es) 905 with terminal 14, to transmit and receive information, to the extent needed, during transaction processing.

Input interfaces 910 also electrically connect and interface user input device 980, such as keyboard 23 and mouse 24, to the client computer. Display 22, such as a conventional color monitor, and printer 25, such as a conventional laser printer used as a transaction printer, are connected, via leads 973 and 975, respectively, to output interfaces 970. The output interfaces provide requisite circuitry to electrically connect and interface the display and printer to the computer system.

Furthermore, since the specific hardware components of client computer 21 as well as all aspects of the software stored within memory 950, apart from the various software modules, as discussed below, that implement the present invention, are conventional and well-known, they will not be discussed in any further detail.

As noted above, the present invention may be implemented in a web-based environment where either or both a selling and paying agent utilize client computer 21 to access server 11, either through a dial-up telephonic connection or an Internet web-based connection.

Figure 10:
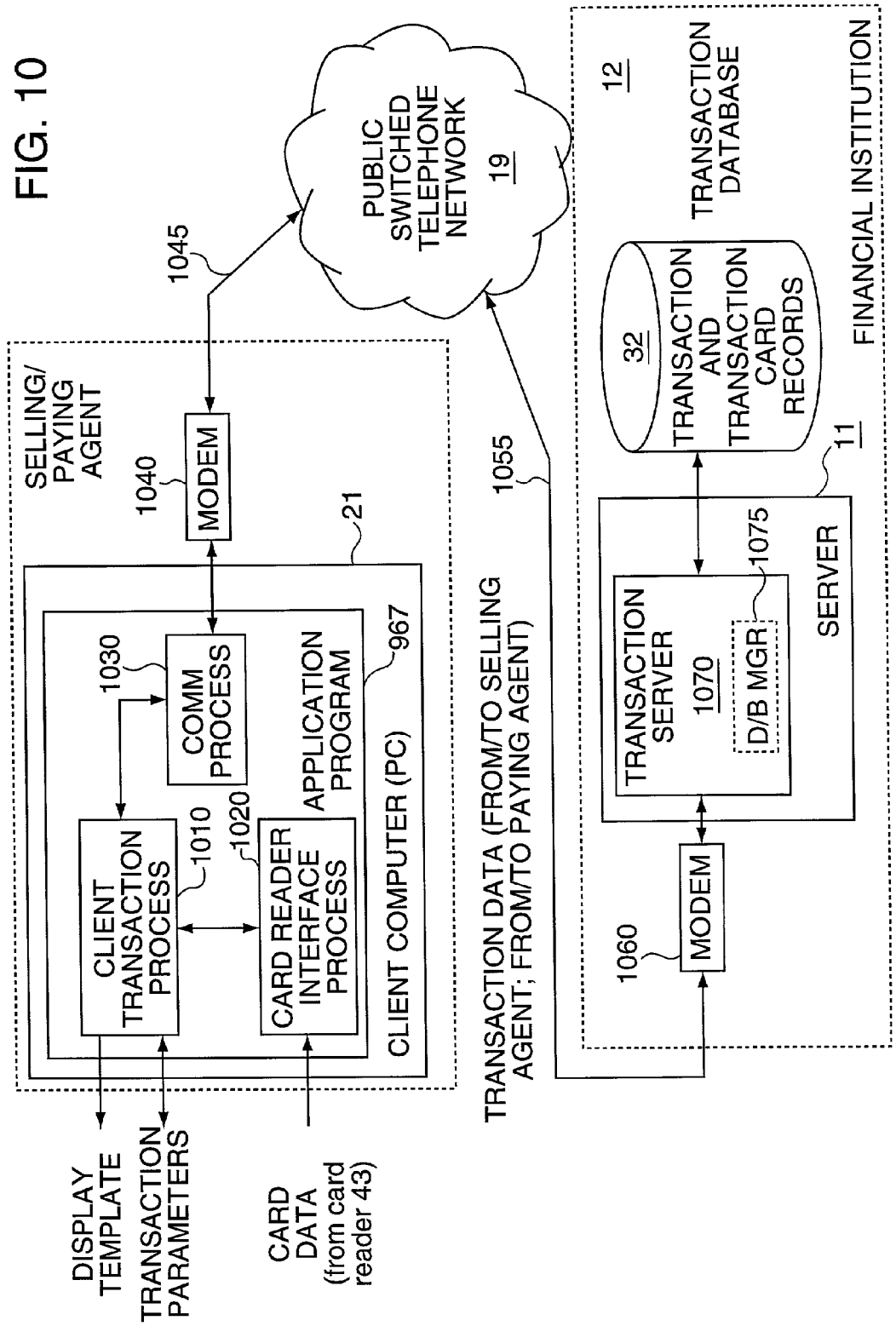
FIG. 10 depicts a high-level block diagram of the software processes utilized by the present invention in a client-server embodiment with PSTN-based communication occurring between an agent and server 11.

In that regard, FIG. 10 depicts a high-level block diagram of the software processes utilized by the present invention in a client-server embodiment with PSTN-based communication occurring between an agent and server 11. The same basic methodology described below in connection with this figure applies to use of a POS terminal, e.g., terminal 14, in lieu of a client PC.

As shown, application program 967 executing within client computer 21 contains client transaction process 1010, card reader interface process 1020 and communication (COMM) process 1030. The client computer, when accessing server 11 at the financial institution, establishes a dial-up circuit-switched connection, through local modem 1040, communication line 1045, PSTN 19 and communication line 1055, to peer modem 1060 situated within the financial institution and connected to server 11. Though server 11 may utilize quite a number of modems in order to handle a relatively large number of transactions involving quite a number of different agents, for purposes of simplifying this figure (as well as FIG. 11 which is discussed below), I will discuss this figure (as well as FIG. 11) in the context of just one transaction.

When an agent desires to initiate a transaction, whether it is a selling agent seeking to activate a transaction card for a customer or initiate a money transfer from the customer to his(her) designated beneficiary, or a paying agent seeking to access a transaction record and to effect a payment to a beneficiary, that agent first initiates execution of client transaction process 1010. This process performs all client transaction processing for both card activation (i.e., sales), money transfer initiations and beneficiary payment.

Generally speaking, for card activation, process 1100 obtains card data through card reader 43, which is connected to client computer 21, queries the agent for and obtains other transaction data through direct keyboard entry, locally displays transaction data on a local monitor, and exchanges transaction data, via communication process 1030, with server 11. Process 1010 may also obtain transaction data from other peripheral input devices (conventional and not shown) that might be used to obtain transaction data from the agent. For a payment transaction, this process requires obtaining a folio number from the beneficiary, through manual keyboard entry by the agent, using the folio number to retrieve an associated transaction record data from server 11 and exchanges payment information with the server regarding the status of the payment, e.g., to "close-out" the transaction in the event of a payment to an authorized beneficiary.

In particular, prior to the start of any transaction, e.g., when process 1010 begins executing or after it has completed a transaction, it displays a transaction start screen display on the local monitor for the agent's use. This screen display contains appropriate instructions as well as a conventional soft-selection field for the agent to indicate whether (s)he wants to initiate a card activation or a payment transaction. Should the agent signify a card activation transaction, process 1010 then displays an appropriate data entry screen containing a data entry field for the transaction card number (card data). This number can be entered manually by the agent or alternatively, through card reader interface process 1020, by the agent simply swiping the transaction card of the customer through the card reader 43 when instructed to do so by the screen display. The resulting card data is captured by process 1020 and supplied to client transaction process 1010. Thereafter, process 1010, through communication process 1030, establishes a dial-up connection, through modem 1040, to server 11 situated at the financial institution. Once this connection is established, process 1010 transmits the card number and transaction type (here, card activation) to server 11. This server, in turn, accesses, through its internal transaction server 1070, which, in turn and operating in conjunction with database manager 1075, accesses the corresponding transaction card record from transaction database 32. If this record exists, i.e., the card is valid, transaction server 1070 transmits a suitable access-successful/activation-start message back to client computer 21 and specifically to client transaction process 1010 executing thereat. In response to this message, process 1010 displays a transaction template containing various fields through which the agent queries the customer for customer and beneficiary information, as delineated above. Once the agent signifies, again through use of an appropriate soft-selection key, that all the information is entered, process 1010 then transmits this information through the dial-up connection, then existing between client computer 21 and server 11, and particularly to transaction server 1070 situated within server 11. Upon receipt of this information, server 1070 updates the transaction card record for this transaction card with the information supplied by the agent and also updates the card record to signify that that particular transaction card is now activated and ready for subsequent use in transferring funds between the customer and his(her) designated beneficiary. Once the transaction card record has been so updated and the card activated, transaction server 1070 broadcasts a suitable card-activated/complete message back to client computer 21, and specifically to client transaction process 1010. Process 1010 provides a visual notification to the agent that the card is now activated, who, in turn, can appropriately notify the customer.

Should the agent select a money transfer initiation instead of a card activation, process 1010 displays an appropriate data entry screen to prompt the agent to enter a transaction card number, either manually or by swiping a transaction card then presented by a customer. Once this number is obtained, process 1010 again establishes a dial-up connection to server 11 and within this server to transaction server 1070. After this connection is established, process 1010 transmits the card number and transaction type (here, card activation) to server 1070 which, in turn, accesses the transaction card record for this customer and, if the card number is valid, transmits, within a money-transfer/start message, the customer and beneficiary information in this record back to the client transaction process 1010. In response to this information, process 1010 displays an appropriate display screen containing monetary fields, both in terms of a payment amount and a currency. The agent asks the customer for the amount of the payment to be made. This information, as supplied by the customer, is then manually entered by the agent into the client computer and displayed by process 1010 in the display screen, and then, once confirmed by the agent, communicated, in a suitable money-transfer/amount message, to the transaction server. In response, the transaction server specifies the transaction fee for the transfer and transmits this amount, in a money-transfer/total-amount message, back to the client transaction process 1010. Once the agent has collected the proper amount of funds from the customer, the agent completes initiation of the transaction by confirming the transaction to the client computer, again through depression of an appropriate soft-key. In response, process 1010 transmits this confirmation, as a money-transfer/confirm message, to the server, specifically transaction server 1070, which, in turn, creates a corresponding transaction record, within database 32, for this card and the customer and his(her) beneficiary, in the manner described above and populates that record with information pertinent to that particular transaction. Once this occurs, the transaction server supplies transaction information, through a money-transfer/accept message, back to process 1010 with an instruction to print a two-part transaction receipt, as shown in Table 3 above, for the customer to sign and which provides the folio number for this transaction.

To effectuate payment to a beneficiary, process 1010, through selection of this particular type of transaction, displays a different display screen through which the agent asks the beneficiary for a folio number. As discussed above, this number is unique to each transaction. Once the beneficiary provides this number to the agent, the agent completely enters it and process 1010 locally displays it on monitor 22, the agent then instructs process 1010, again through depression of an appropriate soft-key to establish a dial-up circuit switched connection, through communication process 1030 and modem 1040, to server 11, and then to transmit a payment transaction initiation message containing this folio number and a transaction type (here, payment) to transaction server 1070. In response to this number, server 1070 accesses database 32 to locate a transaction record bearing this folio number. Once this record is located and accessed, server 1070 transmits payment and beneficiary information, within a payment-info message, back to client transaction process 1010. Process 1010 then displays this information on monitor 22. At this point, the paying agent requests personal identification from the beneficiary. If the agent is satisfied with the identification, the agent confirms the transfer through client process 1010, again through depression of an associated soft-key. In response to this confirmation, process 1010 sends a payment-confirm message to transaction server 1070 which, in turn, updates, in the manner described above, the transaction record for this transaction to signify that payment was made and hence the transaction is "closed-out". Once this update occurs, server 1070 sends, via a payment-receipt message, an instruction back to client transaction process 1010 to print a two-part transaction receipt, containing the information shown in Table 4 above, for the beneficiary to sign prior to actual receipt of the transferred funds.

To provide increased security against third-party interception, client process 1010 and transaction server 1070 can each employ appropriate cryptographic processing, such as, e.g., public key cryptography (where each agent is assigned a different public/private key pair by the financial institution with that pair being programmed into application program 967 used by that agent), or symmetric-key cryptography. With public key cryptography, the transaction server uses a public key assigned to a given agent for encrypting transaction information destined to the client computer used by that agent, while that agent uses his(her) own secret key for decrypting messages it so receives from the server. The server utilizes its own public-private key pair in a similar manner. With a symmetric key, the same key is used for both encryption and decryption and is kept secret and secure by both the client computer and the transaction server.

Figure 11:
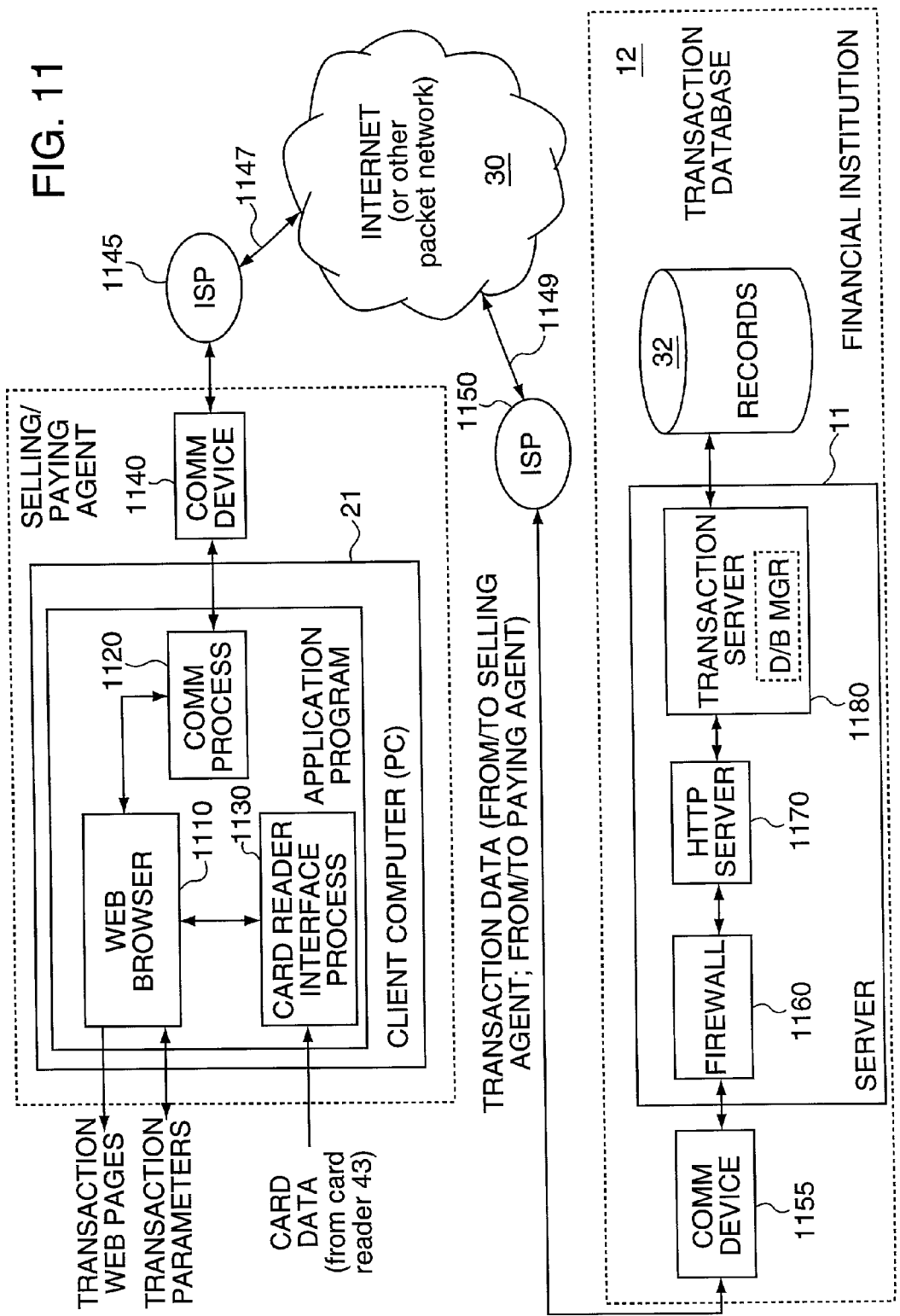
FIG. 11 depicts a high-level block diagram of the software processes utilized by the present invention in a client-server embodiment but with web-based communication occurring between an agent and server 11.

FIG. 11 depicts a high-level block diagram of the software processes utilized by the present invention also in a client-server embodiment but with web-based communication between an agent and server 11.

Here, web browser 1110 takes the place of client transaction process 1010 shown in FIG. 10; financial institution 12 contains a web server (composed of HTTP server 1170 and transaction server 1180) rather than just transaction server 1070 alone. Since the basic client-server transaction processing, apart from the use of web-based messaging, for card activation, money transfer initiation and payment, is essentially identical to that described above in conjunction with FIG. 10, those details will be omitted here.

Rather than a telephonic connection, as shown in FIG. 10, the system shown in FIG. 11 relies on client computer 21 establishing a bi-directional network connection through Internet 30 to server 11. This connection occurs through conventional near-end communication device 1140 (which may be, e.g., a modem, but is not so limited), local Internet Service Provider (ISP) 1145, Internet 30 and far-end ISP 1150 (which serves the financial institution) and ultimately far-end communication device 1155 (which may be, e.g., a router or other device that provides a packet interface to a persistent Internet connection). Server 1180 contains conventional firewall computer 1160, HTTP server 1170 and transaction server 1180. Transaction server 1180 is essentially the same as server 1070 shown in FIG. 10, and hence will not be described any further. Firewall 1160 serves to filter incoming packet communication to server 1180 and, by doing so, significantly frustrate unauthorized access to the transaction server.

Rather than transmitting messages containing transaction data, server 11, specifically transaction server 1180, downloads HTML files containing web page templates which, upon receipt and processing by web browser 1110, are locally displayed to the agent. The agent then enters the information, prompted by various data entry fields in each page, and, through the browser, transmits HTTP requests containing the information back to the server. The agent can also specify the type of transaction desired to the transaction server through appropriate interaction, such as mouse clicks over corresponding display "widgets", with an initial (or home) and/or other web page(s) supplied by server 1180, as well as provide other transaction instructions and/or confirmations to transaction server 1080.

HTTP server 1170 implements a HTTP (Hypertext Transfer Protocol) which is used, by both browser 1110 and transaction server 1180, to transport messages, here financial information and related instructions, over the Internet between the browser and server 1180. Both browser 1110 and HTTP Server 1170 implement both sides of this protocol, including packet encapsulation (assembly) as well as packet dis-assembly. In addition, this server through the use of conventional HTTP GET and POST messages issued by the browser or server manages information flow between browser 1110 and transaction server 1180 to either, as requested by the browser or the transaction server, supply information from database 32 to the browser for local display thereat or update this database with information supplied by the browser.

A transaction card number for a customer can also be supplied through card reader 43, by the agent swiping the card, but with card reader interface process 1130 supplying that information to browser 1110. Browser 1110 can be modified, in a manner readily apparent to those skilled in the art, through addition of, e.g., an appropriate JAVA-implemented routine to properly interact with process 1130 and therethrough obtain transaction card data from card reader 43.

For added security, transaction messages may be protected, through encryption, using conventional SSL (secure socket library) based cryptography in conjunction with HTTP. At the start of a session (here, a transaction session between client computer 21 and server 11), SSL undertakes client-server negotiations to negotiate a particular session key and a cryptographic algorithm, such as an RSA public-key cryptosystem, for both the client and server to use during that session. Once the negotiations conclude, the remaining messages are so encrypted, and communicated in encrypted form, via HTTP packets, during that session using the negotiated key and the algorithm. This encryption and decryption would be handled by browser 1110 and, e.g., HTTP server 1180. SSL is currently used, on a widespread basis, for providing security for Internet-based credit card transactions. Advantageously, SSL does not encrypt HTTP transport layer (i.e., TCP port numbers) fields hence allowing use of load balancing servers (as shown in FIG. 12) at the financial institution to distribute transaction traffic to a given server. For further information on SSL, the reader is directed to, e.g., pages 279 and 474-475 of D. Atkins et al, *Internet Security—A Processional Reference*, (© 1996, New Riders Publishing Co.).

Figure 12:
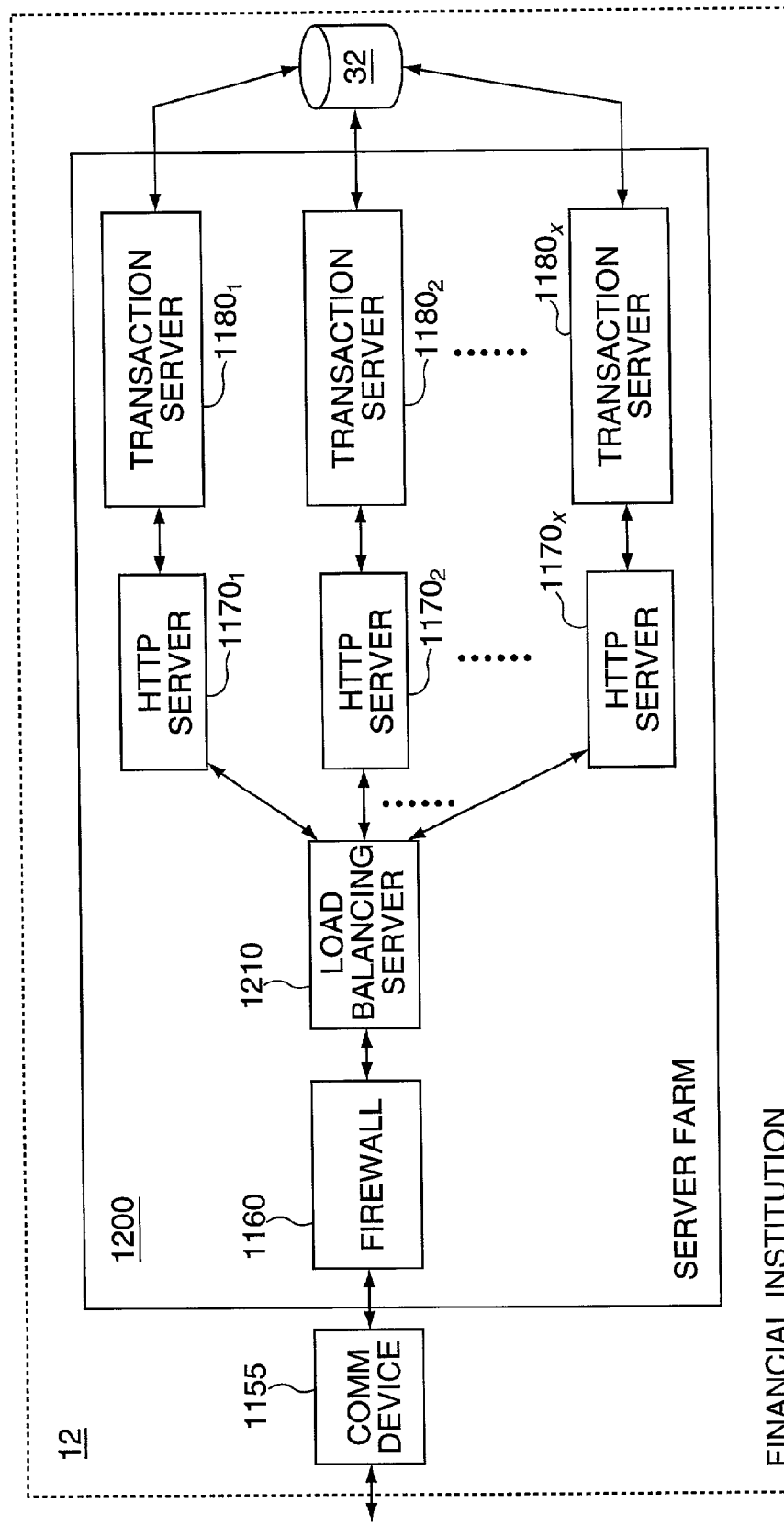
FIG. 12 depicts a high-level block diagram of typical server farm 1200 for use in lieu of server 11, shown in FIG. 11, for processing large numbers of simultaneously occurring web-based financial transactions.

FIG. 12 depicts a high-level block diagram of typical server farm 1200 for use in lieu of server 11 for processing large numbers of simultaneously occurring financial transactions.

Here, rather than utilizing just one transaction server 1180, as shown in FIG. 11, server farm 1200, shown in FIG. 12, contains multiple HTTP servers $1170_1, 1170_2, \ldots, 1170_x$, and corresponding transaction servers $1180_1, 1180_2, \ldots, 1180_x$. To provide secure server connectivity, communication device 1155 is connected to conventional firewall 1160 (though of larger capacity than that shown in FIG. 11, but otherwise identical in function). The firewall, in turn, is connected, as shown in FIG. 12, to load balancing server 1210 which distributes each new financial transaction to a then lightest-loaded HTTP server and transaction server pair in the server farm that is then available to process that transaction. Database 32 permits concurrent access by all the individual transaction servers. However, appropriate and conventional database locking mechanisms are used by the database managers (not shown) in the transaction servers to prevent inadvertent data corruption that would otherwise result from multiple simultaneous accesses being made, by multiple transaction servers, to the same record in the database.

The invention contemplates numerous variations and modifications that will be apparent to those skilled in the art in view of the above description. For instance, card activation and distribution may occur in a number of suitable ways. As described above with respect to card distribution and activation process 39, before giving a customer a transaction card, a selling agent swipes the card in magnetic strip reader 15 (see transmit-data step 83 in FIG. 6). At that point, money-transfer system 10 learns of the existence of that card. In response, server 11 creates a record in database 32 (see record-data step 84). As an alternate procedure, institution 12 could simply record the cards as generic cards with no designation of a selling agent's ID in SELLING AGENT field (field 53). Institution 12 could also load the selling agent's ID into SELLING AGENT (field 53) before distributing transaction cards to the selling agents.

The invention also contemplates that, rather than having a selling agent participate in the card activation process, e.g., via steps 86-90, institution 12 could utilize customer service representatives (CSR) for that purpose. When using a CSR, a customer with a non-activated card 95 could telephone institution 12 and read the card number 96 from the front face of card 95 to a CSR. Using card number 96, the CSR would then access the record for the corresponding transaction card, e.g., record Cl, through server 11. The CSR would then ask the customer to provide the customer and beneficiary information (and possibly, the selling agent's ID), which the CSR loads into CUSTOMER DATA (fields 56) and BENEFICIARY DATA (fields 57) and possibly, SELLING AGENT (field 54). In addition, the CSR would set DISTRIBUTION FLAG (field 54) and ACTIVATION FLAG (field 55) at this time.

To assist with security, institution 12 may issue secret personal-identification numbers (PINs) to selling agents and their employees. Thus, when a selling agent initiates a transaction on behalf of a customer (see input-data step 102 in FIG. 7), institution 12 may require a selling agent to enter two numbers. For example, a selling agent might be required to enter, via keypad 16, a selling agent PIN and an employee PIN, to differentiate different employees working for the same selling agent. Requiring entry of PINs could increase the difficulty of operating data terminal 14 on an unauthorized basis. Alternatively, each such terminal could be fitted with a processor programmed to store and automatically transmit an agent's ID, PIN and/or a terminal tracking number, whenever a data transmission occurs.

As a security measure and as a possible marketing inducement, selling agents may provide customers with a telephone PIN when initiating a transaction. The customer would then have the option of using the telephone PIN to promptly make a toll-free call to the beneficiary from the selling agent's site. It is felt that prompt disclosure of a folio number and an amount to a beneficiary would enhance security as well as provide additional convenience to the beneficiary.

The above illustrative description shows a single beneficiary listed for each transaction card 95. However, cards 95 may also be issued with more than one beneficiary. A selling agent may select, via keyboard 16, whether one, more or all of the recorded beneficiaries are to pick-up or otherwise receive the funds. In fact, the appropriate transaction card record C1-Cr may name the customer as one of the beneficiaries or the only beneficiary. In that case, a customer, who may be traveling to a distant location, would not need to carry a large amount of cash or traveler's checks. A traveler could arrange to have a folio number available to collect money in a local currency upon arrival at a foreign location.

Because security is normally a critical issue in money-transfer systems, other, more secure, payment methods may be desirable. For example, rather than physically delivering cash to a beneficiary, a paying agent may electronically credit the delivered funds to a beneficiary's bank account for subsequent access, in a "piece-meal" fashion, if desired, by the beneficiary. Alternatively, a paying agent's printer 25 may print a check, in favor of the beneficiary, at the time that the payment receipt prints (see print-receipt step 145 in FIG. 8). Still further, paying agents may make the funds available to a beneficiary through a conventional ATM (automatic teller machine) network in a manner described below with respect to FIGS. 13-15.

Figure 13:
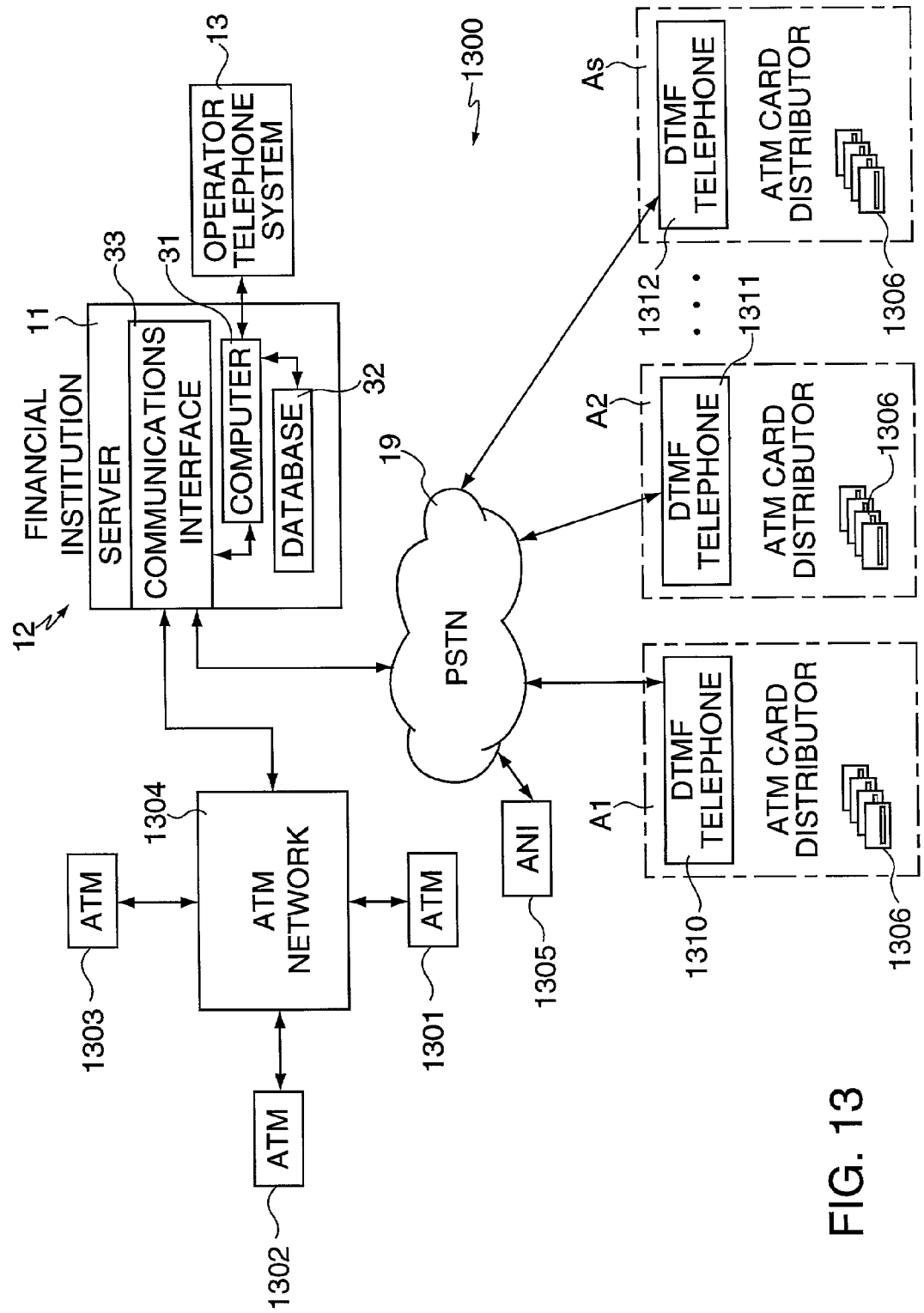
FIG. 13 depicts a high-level schematic diagram of a money-transfer system for providing fund pick-up capabilities to a beneficiary via an ATM (automatic teller machine) network.

FIG. 13 illustrates ATM fund-pick-up system 1300, which functions as a money-transfer system by making funds available to a beneficiary via a network of conventional money dispensing machines, such as ATMs 1301-1303 associated with ATM network 1304. ATM fund-pick-up system 1300 comprises a money-transfer company in the form of financial institution 12, which is associated with "s" ATM card distributor sites Al-As (where "s" is an integer, typically numbering in the thousands or more).

ATM card distributor sites Al-As include conventional DTMF (Dual-Tone, Multiple Frequency) telephones 1310-1312, respectively, for communicating with server 11 via PSTN 19 and the communications interface 33 located at financial institution 12. In addition to the components shown in FIG. 1 (viz., communications interface 33, computer 31 and database 32), financial institution 12 of FIG. 13 also comprises operator telephone system 13, which connects to computer 31. For reasons that will become clear from the following description of FIG. 15, operator telephone system 13 comprises conventional telephone equipment that allows one or more customer service representatives (CSR's) to communicate with ATM card distributor sites A1-As via server 11 and PSTN 19. In addition, a conventional ANI (automatic number identification) system 1305 connects to PSTN 19 for generating an ANI signal (identifying the telephone number, name, and other data of a calling party), which PSTN 19 automatically transmits to a called party, such as financial institution 12.

Figure 14:
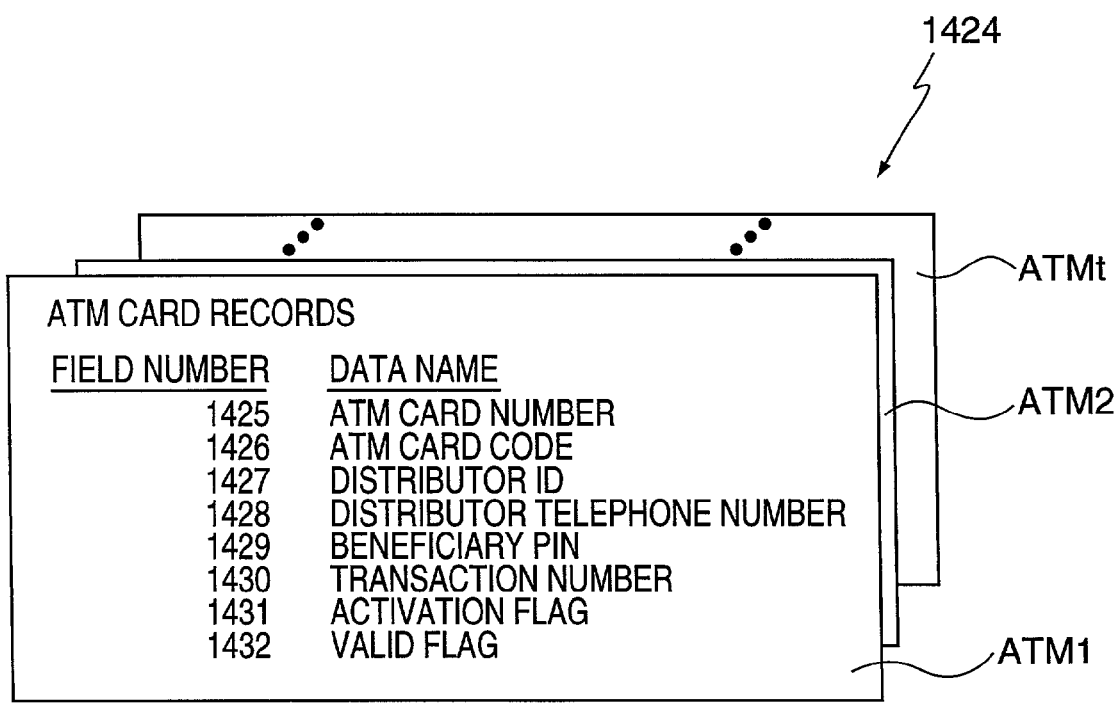
FIG. 14 schematically illustrates ATM card data 1424 stored as a set of ATM card records ATM1-ATMt for use in the system of FIG. 13.

ATM fund-pick-up system 1300 uses conventional ATM cards 1306, along with a personal code or PIN (personal identification number), as money pick-up devices for use by beneficiaries when operating ATMs 1301-1303. Financial institution 12 initially sends conventional, non-activated ATM cards 1306 to ATM card distributors located at ATM card distributor sites A1-As. With reference to FIGS. 13 and 14, financial institution 12 stores ATM card data 1424 in database 32. ATM card data 1424 comprise ATM card records ATM1-ATMt (where "t" is the number of ATM cards 1306 produced). Each of the conventional ATM cards 1306 includes a unique ATM card number (typically a sixteen digit number) that is visibly printed or embossed on the face of each ATM card 1306. In addition, each ATM card 1306 includes a corresponding unique ATM card code in the form of an alphanumeric code that is magnetically stored in a conventional magnetic strip located on the rear surface of the ATM card 1306.

For convenience in maintaining an ATM card inventory, financial institution 12 may forward the ATM cards to ATM card distributors in large batches in which the ATM card numbers are serially arranged. However, to discourage fraud and/or make fraud attempts more difficult, the corresponding ATM card codes stored in the magnetic strips are randomly or quasi-randomly arranged. Financial institution 12 creates records of the ATM codes and numbers before distributing ATM cards 1306.

Server 11 initially creates each ATM card record ATM1-ATMt by having computer 31 load a specific ATM CARD NUMBER and its corresponding ATM CARD CODE into respective fields 1425 and 1426. In addition, ACTIVATION FLAG (field 1431) and VALID FLAG (field 1432) are initially reset to indicate that the corresponding ATM card is a non-activated, valid ATM card. When sending a batch of ATM cards 1306 to a specific ATM card distributor, financial institution 12 will first have computer 31 load appropriate ATM card data 1424 into those ATM card records ATM1-ATMt that correspond to the specific batch of ATM cards being forwarded. Specifically, computer 31 writes a particular distributor's identification into DISTRIBUTOR ID (field 1427), e.g., the distributor's name, address, PIN, etc., and that distributor's telephone number in DISTRIBUTOR TELEPHONE NUMBER (field 1428) for each of the ATM card records ATM1-ATMt associated with the batch being forwarded. Thus, ATM card data 1424 represents an inventory of all ATM cards that financial institution 12 has sent to ATM card distributors.

Figure 15:
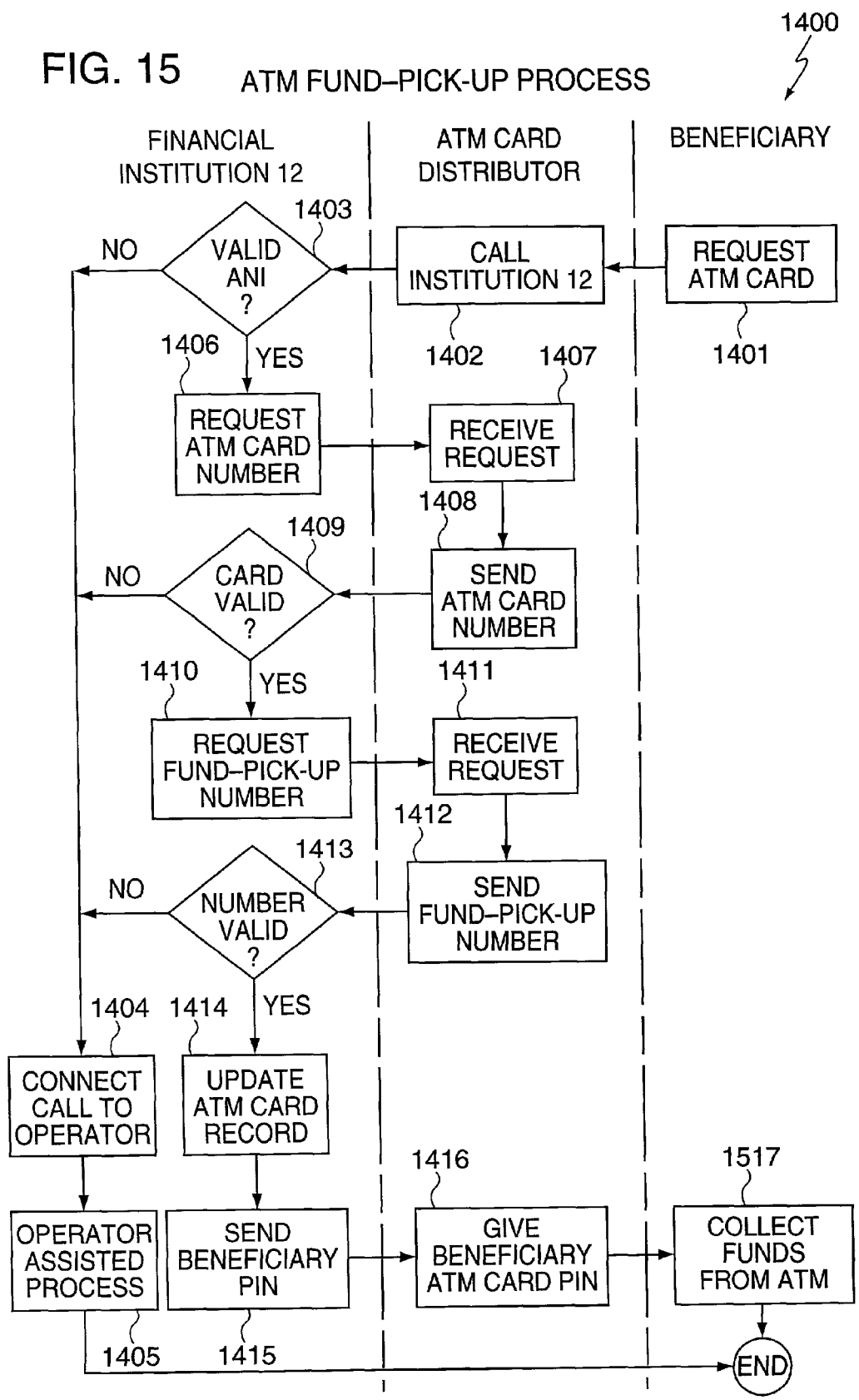
FIG. 15 depicts a flow diagram illustrating an ATM fund pick-up process for use with the system of FIG. 13.

FIG. 15 illustrates the operation of ATM fund-pick-up system 1300 and the details of the corresponding ATM fund-pick-up process 1400. Financial institution 12 performs a portion of the FIG. 15 process (shown in the left side of the figure), while ATM card distributors at sites A1-As perform the steps located in the center of FIG. 15. Finally, the beneficiary wishing to obtain an activated ATM card 1306 for use in collecting the transferred funds performs the steps located in the right said of FIG. 15.

As described above with respect to FIG. 7, a customer who requests that money be transferred to a beneficiary (see customer-request step 101 in FIG. 7) receives a fund-pick-up number (see field 46 in FIG. 2 and the transaction receipt depicted in Table 3). In inform-beneficiary step 12 (see FIG. 7), the customer informs the beneficiary of the appropriate fund-pick-up number, also referred to as a "folio" number. In the present embodiment, the fund-pick-up number acts as a device pick-up code for use by the beneficiary when getting a money pick-up device, such as an ATM card 1306, from one of the distributors 1310-1312.

ATM fund-pick-up process 1400 begins with request-card step 1401 in which a beneficiary with a fund-pick-up number visits one of the ATM card distributor sites, say site A2, and requests that he/she be given an activated ATM card 1306. In response, the ATM card distributor places a telephone call to financial institution 12 via a DTMF telephone, say telephone 1311, in call-institution step 1402. Communications interface 33 receives the call and connects it to computer 31, which has been loaded with a conventional ANI (automatic number identification) recognition routine. As will be seen below in detail, financial institution 12 uses the ANI signal as a distributor identification signal to verify that a request to activate a particular ATM card 1306 is being communicated from the DTMF telephone belonging to the distributor that originally received the ATM card 1306 in question.

In decision step 1403, computer 31 processes the telephone call by first looking for a valid ANI signal. If the ANI signal is "unknown", "blocked" or otherwise indeterminable, process 1400 exits decision step 1403 via the "NO" path causing computer 31 to connect the call to operator telephone system 13, in connect-operator step 1404. In response, a CSR (customer service representative) gives operator assistance, in operator-assisted process step 1405, which may include manual activation, rejection and/or invalidation of an ATM card 1306 by the CSR.

On the other hand, if computer 31, in decision step 1403, recognizes that the ANI signal contains a "valid" telephone number, process 1400 exits decision step 1403 via the "YES" path to request step 1406. In request step 1406, server 11 transmits an audio request to the ATM card distributor to punch-in an ATM card number on the keypad of the distributor's DTMF telephone. After receiving the request in receive step 1407, the ATM card distributor selects an ATM card 1306 from inventory and keys-in the corresponding ATM card number, in send step 1408, using the keypad of the distributor's DTMF telephone.

Next, computer 31 receives the transmitted ATM card number and invokes decision step 1409 to determine whether or not ATM card records ATM1 -ATMt show that the ATM card 1306 in question was one that financial institution 12 originally sent to the ATM card distributor involved. Specifically, in decision step 1409, computer 31 uses the transmitted ATM card number to search fields 1425 (ATM CARD NUMBER)

in ATM card records ATM1-ATMt for a match with the transmitted ATM card number. When a matching record is found, say ATM card record ATM2, computer 31 compares the received caller-ID telephone number (see decision step 1409) with the telephone number contained in field 1528 (DISTRIBUTOR TELEPHONE NUMBER) for ATM card record ATM2. If, in decision step 1409, computer 31 finds that these telephone numbers match, computer 31 reads fields 1431 and 1432 to see if these fields each are in a reset state, indicating respectively that the corresponding ATM card 1306 has not yet been activated and is a valid card. If, in decision step 1409, computer 31 finds a positive match with respect to fields 1525, 1528, 1531 and 1532, as described above, process 1400 proceeds to request step 1410 via the "YES" path of decision step 1409.

However, if, in decision step 1409, computer 31 finds a negative match for any of the fields 1525, 1528, 1531 and 1532, as described above, process 1400 proceeds to connect-operator step 1404 via the "NO" path of decision step 1409. Again, a CSR will give operator assistance, in operator-assisted process step 1405, which may include operator activation, rejection and/or invalidation of the ATM card 1306 in question.

In request step 1410, server 11 transmits to the ATM card distributor an audio request, asking the distributor to punch-in the fund-pick-up number that the beneficiary provided when requesting an ATM card 1306. After receiving the request in receive step 1411, the ATM card distributor keys-in the fund-pick-up number, in send step 1412, using the keypad of the distributor's DTMF telephone. Computer 31, after receiving the transmitted fund-pick-up number, invokes decision step 1413. Using the transmitted fund-pick-up number, computer 31 searches transaction data 27 (see FIG. 2) in database 32 to locate the corresponding transaction. Specifically, computer 31 searches fields 46 (FUND-PICK-UP NUMBER) in transaction records T1-Tq for a match with the fund-pick-up number punched-in by the ATM card distributor. When a matching transaction record is found, say transaction record T2, computer 31 reads the corresponding STATUS (field 52). If computer 31 finds that the transaction is an open transaction, i.e., field 52 for transaction record T2 contains the code "open", meaning that the beneficiary's fund-pick-up number is a "valid" number, process 1400 proceeds to update step 1414 via the "YES" path of decision step 1413. However, if, in decision step 1413, computer 31 finds the beneficiary's fund-pick-up number to be invalid, e.g., the number does not exist, or is associated with a "closed" or "canceled" transaction, etc., process 1400 proceeds to connect-operator step 1404 via the "NO" path of decision step 1413. Again, a CSR will give operator assistance, in operator-assisted process step 1405, which may include manual activation, rejection and/or invalidation of the ATM card 1306 in question.

In update step 1414, computer 31 updates the data contained in the appropriate ATM card record, say ATM card record ATM2. Specifically, computer 31 first sets ACTIVATION FLAG (field 1432), indicating that the corresponding ATM card 1306 is an activated card. Second, computer 31 copies the corresponding transaction number to the appropriate ATM card record. Specifically, computer 31 copies the contents of field 42 (TRANSACTION NUMBER) of, say, transaction record T2 (see FIG. 2), to field 1430 (TRANSACTION NUMBER) of, say, ATM card record ATM2. Third, computer 31 retrieves an unused PIN from a beneficiary PIN lookup table located in database 32. Computer 31 loads the unused PIN into field 1429 (BENEFICIARY PIN).

After updating the appropriate ATM card record, ATM fund-pick-up process 1400 proceeds to send step 1415. In send step 1415, server 11 transmits to the appropriate ATM card distributor an audio message revealing the beneficiary PIN that is to be used with the ATM card 1306 being activated. In give-card/PIN step 1416, the ATM card distributor gives the beneficiary the activated ATM card 1306 and the corresponding PIN. Next, in collect step 1517, the beneficiary uses the activated ATM card 1306 and its corresponding PIN to collect the transferred funds from an ATM, say ATM 1302, as if the beneficiary were using a conventional bank ATM card to withdraw funds from a bank. ATM network 1304 uses the PIN and the ATM code, read from the magnetic strip on ATM card 1306, to access records (e.g., ATM card records, transaction records, etc.) from financial institution 12 via communications interface 33. These records are updated in real time as ATM transactions are generated and paid by ATM network 1304.

Various modifications of the ATM payment technique described above with respect to FIGS. 13-15 are contemplated and may be resorted to by those skilled in the art. For instance, server 11 may be equipped with a speech recognition system that would allow an ATM card distributor to respond with voiced messages to data requests made in request steps 1406 and 1410 (see FIG. 15). While the above description relates ATM fund-pick-up process 1400 to the money-transfer techniques disclosed with respect to FIGS. 1-12, process 1400 is also applicable to other money-transfer systems that provide a beneficiary with a fund-pick-up number or other secret code to collect funds at a remote location.

In addition, it is noted that in ATM fund-pick-up process 1400, a valid fund-pick-up number is the sole means of identification used by a beneficiary when obtaining an activated ATM card 1306. As such, the invention contemplates that financial institution 12 will inform the customer that it is the responsibility of the customer and the beneficiary to keep the fund-pick-up number secure and confidential. As an added measure of security, however, ATM fund-pick-up process 1400 could be modified further to require a beneficiary to also present to an ATM distributor some personal identification, e.g., a driver's license, a passport, etc. Server 11 would then prompt the ATM distributor, in request step 1410, for example, to key in or speak the beneficiary's name in addition to the fund-pick-up number. Then in decision step 1413, for example, computer 31 could determine not only the validity of the fund-pick-up number but also whether or not that particular fund-pick-up number corresponds to the particular beneficiary involved. Specifically, in decision step 1413, computer 31 would first locate the appropriate transaction record (see transaction records T1-Tq in FIG. 2) containing the fund-pick-up number provided by the beneficiary and keyed in by the ATM distributor (see FUND-PICK-UP NUMBER in field 46). If the transaction record in question has an "open" status (see STATUS field 52), computer 31 would then determine whether or not the corresponding beneficiary name contained in BENEFICIARY DATA field 56 matches the beneficiary name keyed in or voiced by the ATM distributor. When finding a discrepancy, computer 31 would connect the call to operator telephone system 13 via connect step 1404.

The invention contemplates that when using a typical ATM network 1304, financial institution 12 could make funds available to a beneficiary at ATMs 1301-1303 within 30 minutes after a transaction is initiated (e.g., after receive receipt step 119 in FIG. 7 has been executed). In addition and as described above, the status (see STATUS in field 52 of FIG. 2) of a transaction should remain "open" for only a fixed period of time (e.g., thirty days). If a beneficiary fails to collect the transferred funds (see TRANSFERRED AMOUNT in field 47 of FIG. 2) within the fixed time period, server 11 may be programmed to automatically cancel the transaction. For instance, server 11 could cancel the transaction, by, for example, changing the contents of the STATUS field (field 52) from "OPEN" to "EXPIRED". In addition, financial institution 12 would then inform the customer that he/she should collect the funds because the transaction has expired.

Fraudulent activity with respect to ATM fund-pick-up process 1400 could be readily monitored in real- or near-real time by fraud control personnel located at financial institution 12. Computer 31 could readily keep a log of all ATM card numbers that have been entered in send step 1408. If a particular ATM card 1306 has been involved in a given number, say four, unsuccessful activation attempts, computer 31 could automatically void the ATM card 1306 by setting VALID FLAG in field 1432. The invention contemplates that most unsuccessful activation attempts would normally result from an invalid or incorrectly entered fund-pick-up number. Thus, computer 31 and/or customer service personnel, in real- or near-real time, could report an activation problem to fraud control personnel, who determine if an actual fraud is being perpetrated. In addition, the information contained in database 32 can be used to provide a substantial degree of fraud prevention by showing ATM card distributor usage patterns that point to particular distributors having an inordinate number of fraud attempts. In addition, computer 31 and customer service representatives can quickly detect any ATM card shipments that are lost or stolen when, in decision step 1413, an ATM card 1306 is found to be invalid because, for example, the caller-ID does not match the DISTRIBUTOR TELEPHONE NUMBER in field 1428.

The invention contemplates that ATM card distributor sites A1-As, selling-agent sites S1-Sn and paying-agent sites P1-Pm may best be located at airports, banks, department and convenience stores, liquor stores, travel agencies, and the like. In many instances, selling agents and paying agents may be located at the same site and each may function as an ATM card distributor. However, paying-agent sites P1-Pm would best include conveniently located establishments that normally have considerable amounts of cash that they would prefer not having on hand, a requirement that is not applicable to selling agents or ATM card distributors.

Figure 16:
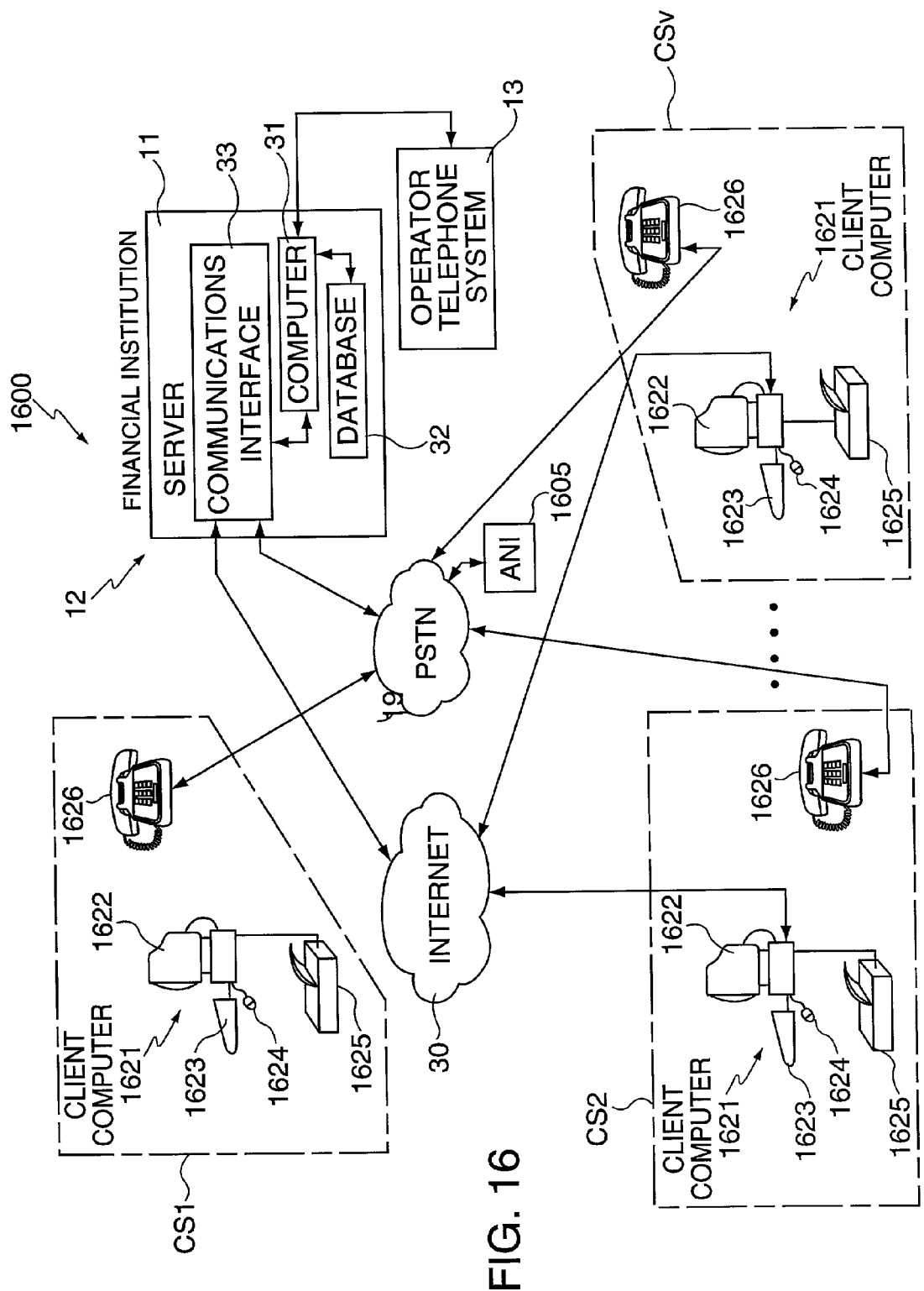
FIG. 16 depicts a high-level schematic diagram of money-transfer system 1600 for providing customers with an online fund transfer service.
Figure 17:
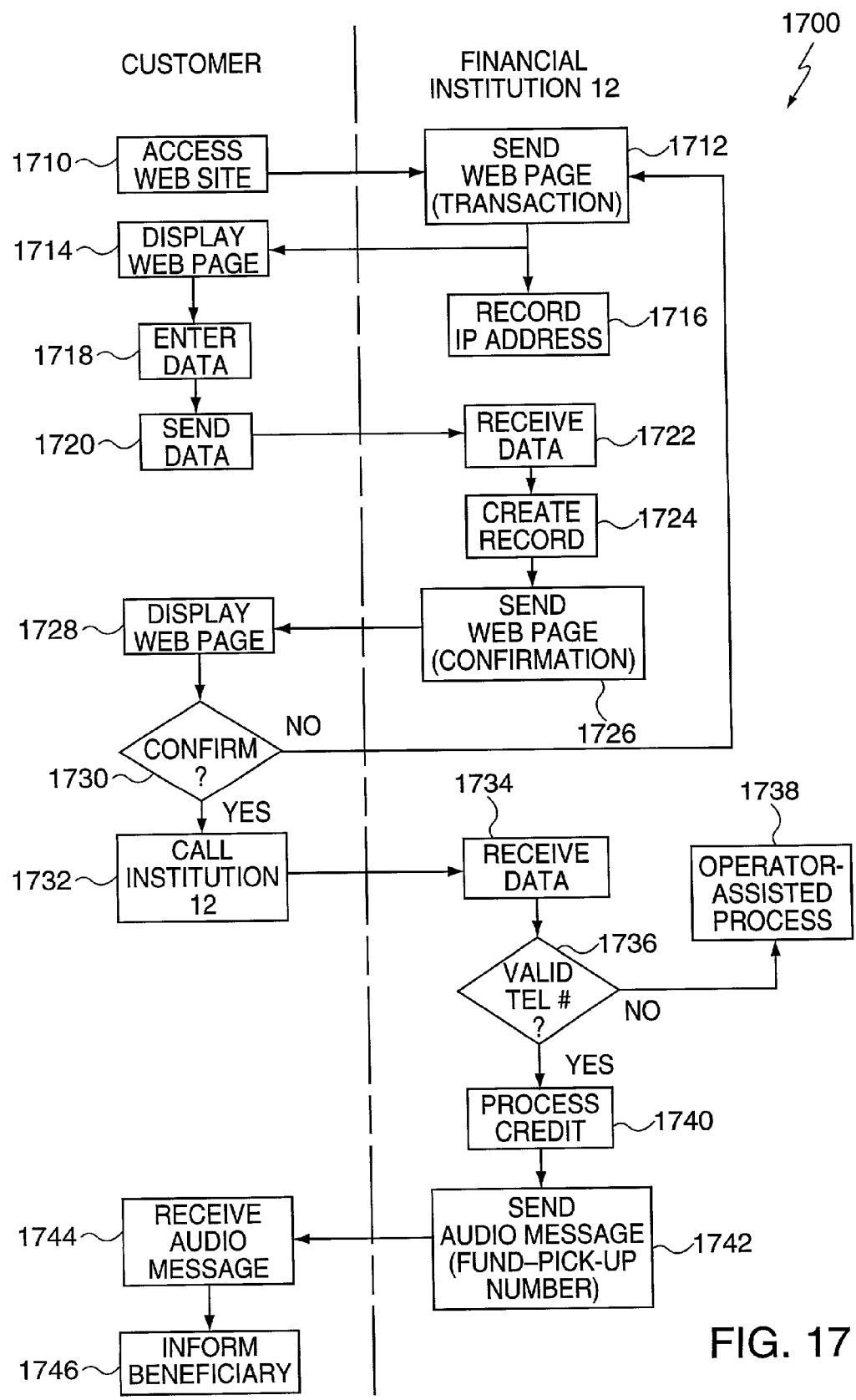
FIG. 17 depicts a flow diagram illustrating online transaction process 1700 for transferring money from a customer to a beneficiary via money-transfer system 1600 of FIG. 16.
Figure 18:
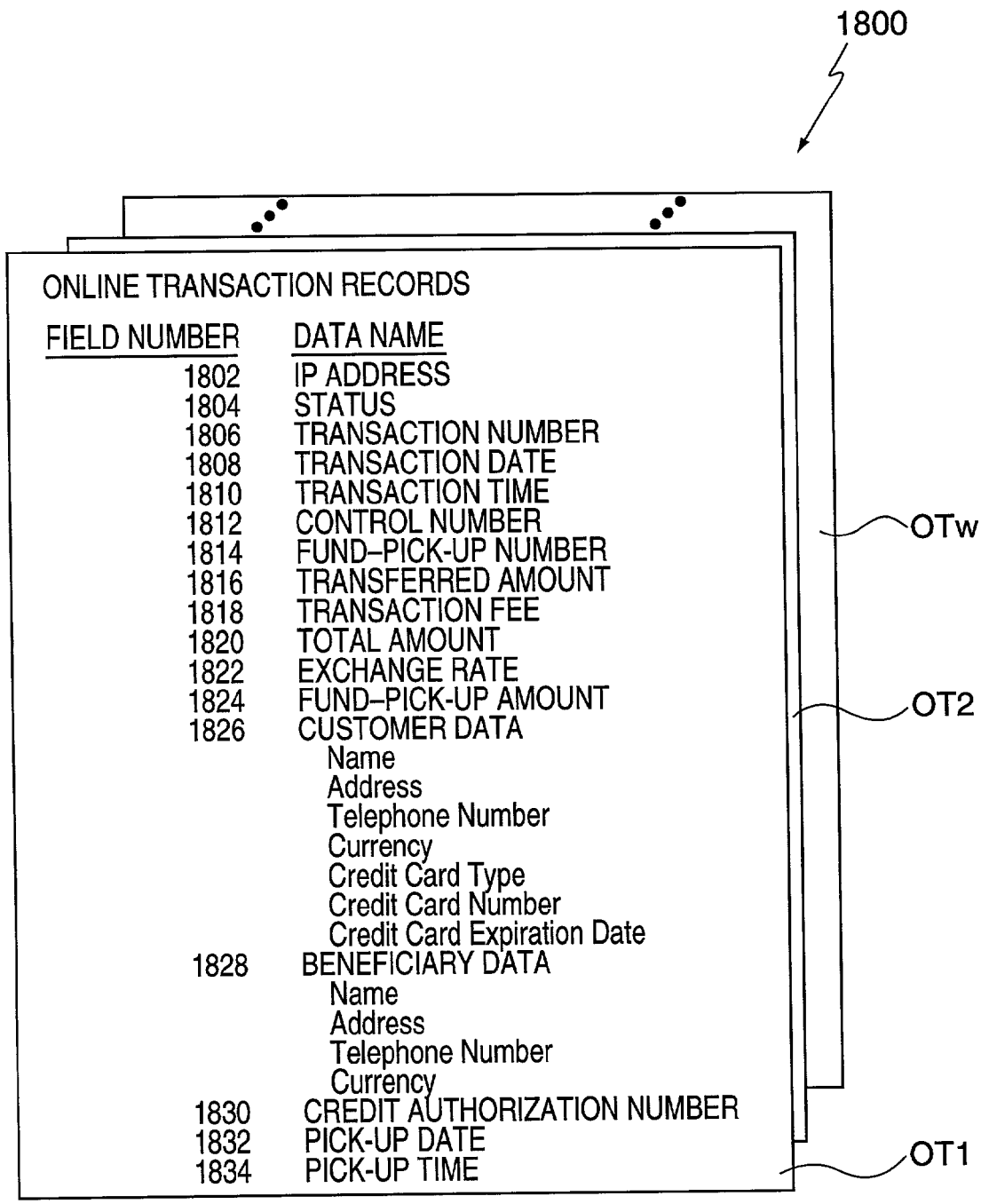
FIG. 18 schematically illustrates online transaction data 1800 stored as a set of online transaction records OT1-OTw for use in the money-transfer system 1600 of FIG. 16.

FIGS. 16-18 illustrate a technique of initiating and processing an online transaction for transferring money from a customer to a beneficiary using Internet 30, PSTN 19 and a customer's bank card, e.g., a credit or debit card. FIG. 16 shows financial institution 12 connected to PSTN 19 and Internet 30 to form online money-transfer system 1600. Financial institution 12 comprises server 11, which provides an online money-transfer service, which is accessible to customers via Internet 30. Server 11 includes host computer 31, database storage 32 and communications interface 33, which connects computer 31 to Internet 30 and PSTN 19. In addition, institution 12 includes an operator telephone system 13, which connects to computer 31. PSTN 19 includes conventional automatic number identification (ANI) system 1605.

Also connected to Internet 30 and PSTN 19 are "v" customers with data communication systems CS1-CSv, where "v" is an integer, typically numbering in the thousands, if not larger. Each of the customer systems CS1-CSv includes a client computer 1621 with monitor 1622, keyboard 1623, mouse 1624 and printer 1625. Client computers 1621 connect to Internet 30 through conventional communications equipment (not specifically shown). Each of the data communication systems CS1-CSv also includes a conventional DTMF (Dual-Tone, Multiple Frequency) telephone 1626, which connects in a conventional manner to PSTN 19.

FIG. 17 illustrates a high-level flow diagram of online transaction process 1700, which money-transfer system 1600 performs when transferring money from a customer to a beneficiary. Customers located at data communication systems CS1-CSv perform a portion of process 1700 (shown in the left side of FIG. 17). Financial institution 12 performs the remainder of process 1700 (shown in the right side of this figure).

A customer accesses a money-transfer service from institution 12 via his or her client computer 1621 and Internet 30. That customer begins by establishing, via access step 1710, an Internet connection through a web browser to a web site maintained by institution 12. In response, server 11 at institution 12, via send step 1712, transmits a transaction web page as an HTML form for display on the customer's monitor 1622. Next, during display step 1714, a browser, executing at the customer's client computer 1621, displays the transaction web page on monitor 1622. In addition to sending a transaction web page, server 11 accesses and records the IP (Internet Protocol) address of the customer's client computer 1621 in record-IP-address step 1716.

Prior to providing the transaction web page, or as part of the transaction web page, institution 12 may require that the customer review and accept certain regulations and/or legal disclaimers in order to proceed with a transaction. However, for simplicity, the flow diagram of FIG. 17 omits these and other conventional steps that parties routinely perform during a typical commercial online transaction.

Using keyboard 1623 and mouse 1624 of client computer 1621, the customer responds, in enter-data step 1718, by entering data into the transaction web page displayed on monitor 1622. The customer is prompted to enter the following information: an amount to be transferred; a customer's name, address (preferably a credit card billing address), telephone number and currency (e.g., U.S. Dollars); and a beneficiary's name, address, telephone number and currency (e.g., Mexican Pesos). In addition, the displayed transaction web page prompts the customer to provide the customer's credit or debit card type (e.g., Visa, Master Card, American Express, etc.) and an expiration date. (In the following discussion, references to the use of a credit card also include the use of other types of electronic payment devices, such as debit cards, check cards, etc.)

At a later step, server 11 instructs the customer to provide the corresponding credit card number via DTMF telephone 1626 over PSTN 19, a more secure communications network. As such, the transaction web page preferably instructs the customer to enter a telephone number for the customer's DTMF telephone 1626, i.e., the same telephone that the customer will use when calling server 11 to provide the credit card number. In addition, the customer is asked not to enter a telephone number for a public telephone, a cellular telephone, a non-U.S. telephone or a blocked telephone.

After entering all of the necessary data into the transaction web page, the customer transmits, in send-data step 1720, the resulting populated transaction web page through the browser, as an HTTP request, to server 11 at institution 12. Upon receiving the data, in receive-data step 1722, server 11 creates, in create-record step 1724, an online transaction record starting with the IP address stored in record step 1716. Computer 31 then loads the received data associated with the IP address into database 32 (see FIG. 16). In this regard, server 11 accesses online transaction data 1800 (see FIG. 18) from database 32, which contains a set of "w" online transaction records OT1-OTw.

As seen in FIG. 18, online transaction records OT1-OTw comprise the following data in the indicated data fields shown below in Table 5 as follows:

Field 1802 —IP ADDRESS
Field 1804 —STATUS
Field 1806 —TRANSACTION NUMBER
Field 1808 —TRANSACTION DATE
Field 1810 —TRANSACTION TIME
Field 1812 —CONTROL NUMBER
Field 1814 —FUND-PICK-UP NUMBER
Field 1816 —TRANSFERRED AMOUNT
Field 1818 —TRANSACTION FEE
Field 1820 —TOTAL AMOUNT
Field 1822 —EXCHANGE RATE
Field 1824 —FUND-PICK-UP AMOUNT
Field 1826 —CUSTOMER'S Name, Address,
   Telephone Number, Currency, and
   Credit Card Type, Number and
   Expiration Date
Field 1828 —BENEFICIARY'S Name, Address,
   Telephone Number and Currency
Field 1830 —CREDIT AUTHORIZATION NUMBER
Field 1832 —PICK-UP DATE
Field 1834 —PICK-UP TIME
TABLE 5—ONLINE TRANSACTION RECORD DATA FIELDS In create-record step 1724, computer 31 begins by activating an available online transaction record, say record OT1, and then stores an IP address in field 1802. Computer 31 next places, in status field 1804, an appropriate status code, e.g., PENDING to indicate that the corresponding transaction has not yet been authorized. Next, computer 31 loads into record OT1 appropriate customer and beneficiary data. Specifically, the customer's name, address, telephone number and currency, e.g., U.S. Dollars, are stored in field 1826. Computer 31 also places the beneficiary's data in field 1828, including name, address, telephone number and currency, e.g., Mexican Pesos. Further, computer 31 generates and places a unique control number in field 1812.

Next, in send step 1726, server 11 generates and sends a confirmation web page to the customer as an HTML document for display on monitor 1622 in display step 1728. In send step 1726, server 11 generates a transaction fee, a total amount, an exchange rate (if any) and a fund-pick-up amount, and places these items in fields 1818, 1820, 1822 and 1824, respectively. The confirmation web page contains a summary of the intended transaction along with a prompt for the customer to either confirm or not confirm its accuracy by, e.g., clicking on a YES or NO "button," via decision step 1730. A preferred confirmation web page contains the following transaction data, as shown in Table 6 below:

FINANCIAL INSTITUTION'S
   NAME AND WEB ADDRESS
IN CUSTOMER CURRENCY (e.g., US Dollars):
   TRANSFERRED AMOUNT
   TRANSACTION FEE
   TOTAL AMOUNT
IN BENEFICIARY CURRENCY (e.g., Mexican Pesos):
   FUND-PICK-UP AMOUNT
EXCHANGE RATE
CUSTOMER'S
   NAME, ADDRESS AND TELEPHONE NUMBER
BENEFICIARY'S
   NAME, ADDRESS AND TELEPHONE NUMBER
CONTROL NUMBER
TOLL-FREE TELEPHONE NUMBER
TABLE 6—TRANSACTION DATA In addition to the above transaction data, a confirmation web page contains instructions asking the customer to make a telephone call to institution 12 to complete the transaction. The confirmation web page advises the customer to place a telephone call, via the customer's DTMF telephone 1626, to the listed toll-free telephone number (see last item in Table 6). The customer is also advised to print the transaction data, via the customer's printer 1625, and to have the printed transaction data and his or her credit card number available when making the toll-free telephone call.

In the event that the customer does not confirm the transaction data (see Table 6) in decision step 1730, the process exits the "NO" path, causing server 11 to return process 1700 to send step 1712. At this point, server 11 gives the customer an opportunity to provide new transaction data in send-data step 1720. In the event that a customer confirms the transaction data in decision step 1730, the customer prints the confirmation web page using his or her printer 1625 and process 1700 exits the "YES" path to call-institution step 1732.

In call-institution step 1732, the customer dials the toll-free telephone number (last item in Table 6) using his or her DTMF telephone 1626. When the telephone connection completes to server 11, computer 31 transmits an audio message, prompting the customer to punch in the control number (second from last item in Table 6), and the customer's credit card number and expiration date.

In receive-data step 1734, server 11 receives and stores the punched-in data, namely, the control number, and the credit card number and expiration date. In addition, ANI generator 1605 generates an ANI signal, which PSTN 19 transmits to the called party, i.e., financial institution 12. Server 11 receives and stores the ANI signal, which normally identifies the telephone number, name, and, possibly, other data associated with the customer's DTMF telephone 1626.

In response to receiving the appropriate data in receive step 1734, computer 31, in decision step 1736, retrieves from database 32 an online transaction record, say record OT1. Computer 31 retrieves the appropriate record by matching the punched-in control number with the previously stored control numbers contained in field 1812 of records OT1-OTw. After the appropriate record is located, computer 31 loads the punched-in credit card number and expiration date in field 1826. In addition, computer 31 attempts to match the telephone number contained in the ANI signal with the telephone number stored in data field 1826, i.e., the telephone number that the customer provided in send-data step 1720. For greater security, computer 31 may further check for a match with a customer's name and/or address if that information is also available in the received ANI signal. If any of the data fail to match, the process exits the NO path of decision step 1736. Thus, at this point, computer 31 essentially passes the customer's telephone call off to a CSR (customer service representative) so that the transaction process may continue via operator-assisted-process step 1738.

If computer 31 confirms the validity of the customer's telephone number and other data, the process exits the YES path of decision step 1736 and proceeds to process-credit step 1740. In process-credit step 1740, computer 31 contacts the appropriate credit-card company to obtain a credit authorization number, which computer 31 loads into field 1830. In addition, computer 31 generates a transaction number (a unique tracking number), a transaction date (current date), a transaction time (current time), and a fund-pick-up number (a randomly generated "folio" number). These data items correspond to the same data items discussed above with respect to Table 1. Computer 31 stores these items in fields 1806, 1808, 1810 and 1814, respectively. Finally, computer 31 changes the status code, in status field 1804, from PENDING to ACTIVE to indicate that institution 12 has authorized the transaction and the funds are being made available for instant pick-up by the designated beneficiary.

In send-message step 1742, computer 31 sends the appropriate fund-pick-up number (see field 1814 in FIG. 18) as an audio message to the customer's DTMF telephone 1626, which is still connected to server 11 via PSTN 19. In addition, the audio message preferably includes a statement that, (1) confirms that the transaction is authorized, (2) instructs the customer that it is the customer's responsibility to guard the fund-pick-up number against theft, and (3) asks the customer to promptly inform the beneficiary of the fund-pick-up number and amount.

Next, the customer receives the message in receive-message step 1744. The customer then contacts, via telephone, E-mail, facsimile transmission, etc., the beneficiary in inform-beneficiary step 1746. The customer informs the beneficiary of the fund-pick-up number and amount in inform-beneficiary step 1742. The beneficiary may use any of the pick-up processes discussed above to collect the transferred funds. For example, the beneficiary can use the fund-pick-up number and amount, and personal identification to personally collect the transferred funds at, for example, one of the paying agent sites P1-Pm (see FIG. 1).

Numerous variations and modifications of the invention will be apparent to those skilled in the art. For example, institution 12 may make provisions for customers to use their client computers 1621 to review in near real time the progress of their transactions using the control and/or fund-pick-up numbers. Also, added security and efficiency can be achieved by having server 11 filter in-coming calls, made during call-institution step 1732, to automatically exclude, during decision step 1736, calls originating from public telephones, cellular phones, non-U.S. telephones and blocked telephones. In addition, institution 12 may monitor customer usage patterns by collecting, storing and analyzing various pieces of originating data, such as IP addresses, customer and beneficiary telephone numbers, etc., which can help detect fraud and/or Bank Secrecy Act violations.

To protect against unauthorized access to customer's credit card numbers, the transaction web page, i.e., the HTTP form displayed in display step 1714, contained no provision for a customer to enter a credit card number. Instead, the confirmation web page, in display step 1728, directs the customer to provide the credit card number over a more secure communications channel, i.e., via a telephone transmission over the PSTN to server 11. Alternatively, online transaction process 1700 may be readily modified to permit customers to enter credit card numbers directly on the transaction web page during enter-data step 1718 and to obtain the fund-pick-up number later during a telephone transmission.

Figure 19:
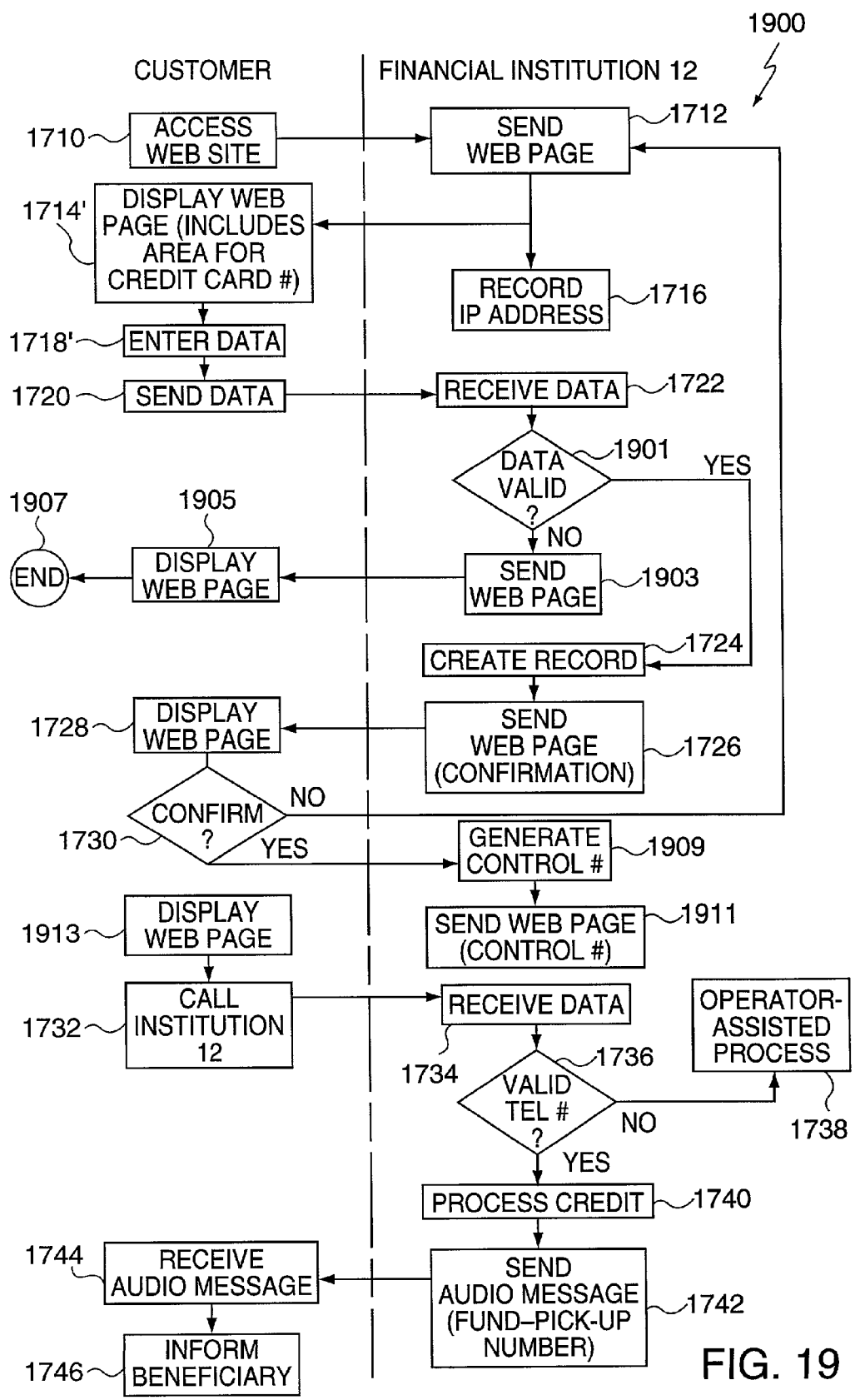
FIG. 19 depicts a flow diagram of an alternate embodiment of an online transaction process for transferring money from a customer to a beneficiary via the money-transfer system of FIG. 16.

FIG. 19 shows an alternate embodiment of an online transaction process in which the customer provides, while online, all credit card information, including credit card number. Many of the steps in online transaction process 1900 are similar to or the same as steps contained in online transaction process 1700. Consequently, those common steps have been designated with the same or similar reference characters in FIG. 19.

Online transaction process 1900 begins with access step 1710, send step 1712 and record-IP-address step 1716. The customer's browser performs display step 1714', which displays on monitor 1622 a transaction web page as an HTML form. The transaction web page in this case differs from that transmitted in process 1700 in that it permits the customer to enter his or her credit card number and expiration date. Thus, in enter-data step 1718', the transaction web page prompts the customer to enter the following data: an amount to be transferred; the customer's name, billing address, telephone number, currency, and credit card type, number and expiration date; and the beneficiary's name, address, telephone number and currency. The customer then transmits, in send-data step 1720, the resulting populated web page through the browser, as an HTTP request, to server 11.

After receiving the data, in receive-data step 1722, server 11, in decision step 1901, checks for the validity of the credit card number and the other data based on internal criteria. For example, server 11 may check the credit card number and/or IP address, etc. against records contained in database 32 of recently submitted requests to detect accounts that have exceeded a weekly limit or have an unusual usage pattern or have been determined to be objectionable for other reasons. If the submitted data is found to be invalid in decision step 1901, server 11 transmits a reject web page to the customer in send step 1903. Monitor 1622 displays the reject web page in display step 1905 and the process terminates in end step 1907.

If, in decision step 1901, computer 31 finds the data to be valid, computer 31 creates an online transaction record, say record OTI (see FIG. 18), in create-record step 1724. Computer 31 creates the online transaction record by initially loading the IP address, stored in record-IP-address step 1716, in field 1802. Computer 31 then loads the received transaction data, which now includes the credit card number and expiration date in addition to the other necessary transaction data.

Next, in send step 1726, server 11 transmits a confirmation web page to the customer. The confirmation web page contains a summary of the transaction data, as shown in Table 7 below:

FINANCIAL INSTIRUTION'S
   NAME AND WEB ADDRESS
IN CUSTOMER CURRENCY (e.g., US Dollars):
   TRANSFERRED AMOUNT
   TRANSACTION FEE
   TOTAL AMOUNT
IN BENEFICIARY CURRENCY (e.g., Mexican Pesos):
   FUND-PICK-UP AMOUNT
   EXCHANGE RATE
CUSTOMER'S
   NAME, TELEPHONE NUMBER, AND CREDIT CARD
   TYPE, NUMBER, BILLING ADDRESS AND EXPIRATION DATE
BENEFICIARY'S
   NAME, ADDRESS AND TELEPHONE NUMBER

TABLE 7—TRANSACTION DATA

The displayed confirmation web page also contains a prompt for the customer to either confirm or not confirm accuracy of the transaction data by, e.g., clicking on a YES or NO "button," via decision step 1730. In addition, the confirmation web page displays instructions advising the customer to print the web page so as to have a record of the transaction data. In the event that a customer does not confirm the transaction data, in decision step 1730, client computer 1621 transmits an HTTP request to institution 12 via the NO path. This action causes server 11 to re-send a transaction web page via send step 1712.

In the event that the customer confirms the transaction data, in decision step 1730, the customer prints the confirmation web page, using his or her printer 1625, as process 1900 exits the "YES" path to generate-control-number step 1909. In step 1909, computer 31 generates a control number and loads it into field 1812 of a corresponding record in online transaction data 1800 (see FIG. 18). Next, server 11 transmits to the customer a web page containing the control number and a toll-free telephone number of server 11, along with instructions asking the customer to make a telephone call to the toll-free telephone number.

In step 1732, the customer dials the toll-free telephone number, using his or her DTMF telephone 1626. When the telephone connection completes to server 11, computer 31 transmits an audio message to DTMF telephone 1626, prompting the customer to punch in the control number. In addition to receiving the control number, server 11 will also receive an ANI signal from ANI generator 1605 via PSTN 19.

In response to receiving the appropriate data in receive step 1734, computer 31, in decision step 1736, retrieves from database 32 an online transaction record, say record OT1. Computer 31 retrieves the appropriate record by matching the punched-in control number with the previously stored control numbers contained in field 1812 of records OT1-OTw. After the appropriate record is located, computer 31 attempts to match the telephone number contained in the ANI signal with the telephone number stored in data field 1826, i.e., the telephone number that the customer provided in send-data step 1720. For greater security, computer 31 may further check for a match with a customer's name and/or address if that information is also available in the received ANI signal. If any of the data fail to match, the process exits the NO path of decision step 1736, passing the customer to a CSR.

If computer 31 finds the customer's telephone number and other data to be valid, process 1900 exits the YES path of decision step 1736 and proceeds to process-credit step 1740. In process-credit step 1740, computer 31 contacts the appropriate credit-card company to obtain a credit authorization number, which computer 31 loads into field 1830. In addition, computer 31 generates a transaction number (a unique tracking number), a transaction date (current date), a transaction time (current time), and a fund-pick-up number (a randomly generated "folio" number). Computer 31 stores these data items in fields 1806, 1808, 1810 and 1814, respectively. Finally, computer 31 changes the status code, in status field 1804, from PENDING to ACTIVE to indicate that institution 12 has authorized the transaction and the funds are available for instant pick-up.

In send-message step 1742, computer 31 sends the appropriate fund-pick-up number (see field 1814 in FIG. 18) as an audio message to the customer's DTMF telephone 1626. In addition, the audio message includes a statement confirming the transaction. Next, the customer receives the message in receive-message step 1744. The customer then contacts the beneficiary in inform-beneficiary step 1746. The customer informs the beneficiary of the fund-pick-up number and amount in inform-beneficiary step 1742. The beneficiary uses the fund-pick-up number and amount, and personal identification to personally collect the transferred funds at, for example, one of the paying agent sites P1-Pm (see FIG. 1).

Figure 20:
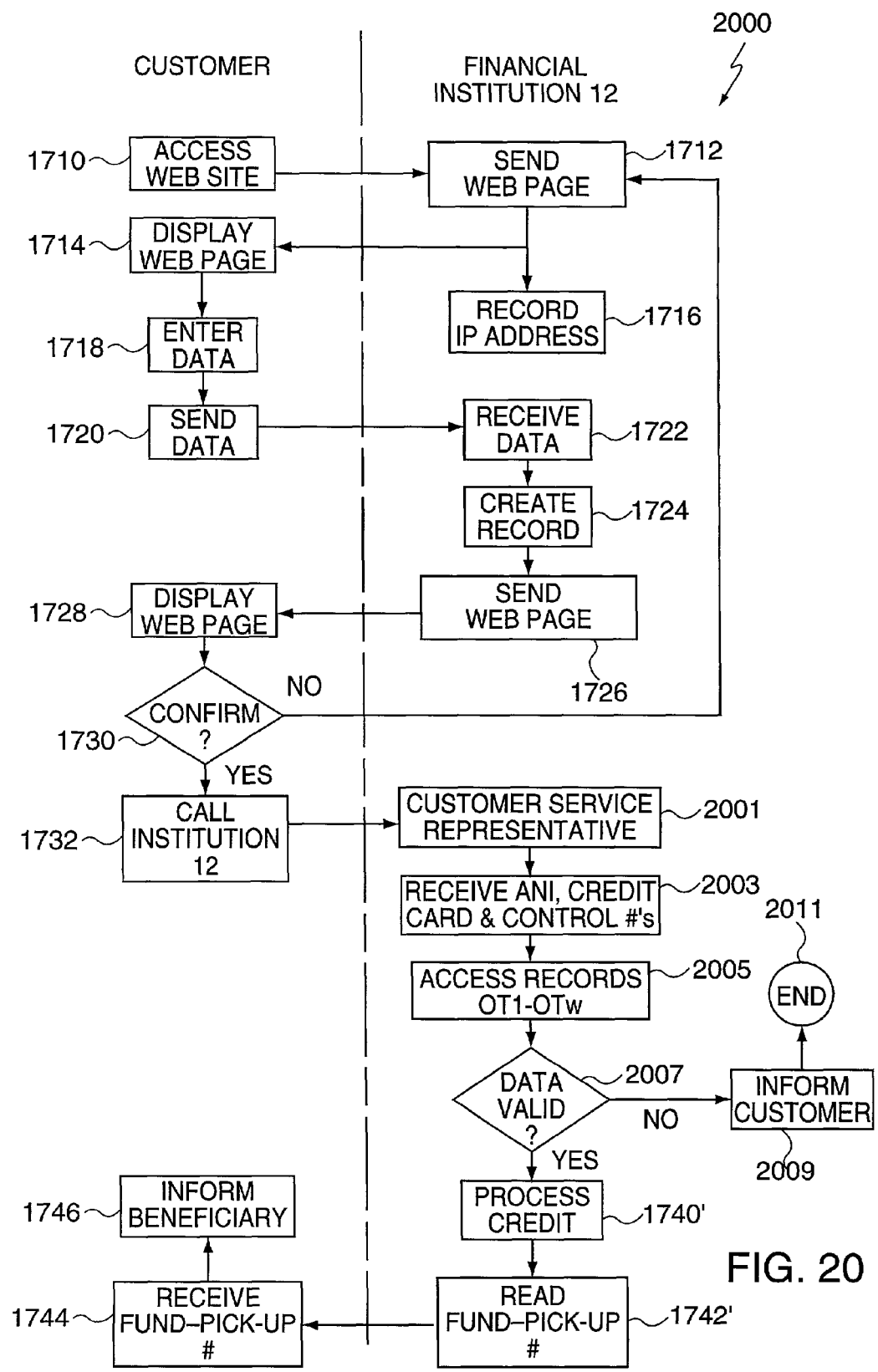
FIG. 20 depicts a flow diagram illustrating another alternate embodiment of an online transaction processing for use with the system of FIG. 16.

For still further protection, online transaction process 1700 may be modified such that a customer communicates with a CSR when completing the process. FIG. 20 illustrates online transaction process 2000, which involves considerable interaction between a customer and a CSR. In process 2000, steps 1710-1732 are identical to those performed in process 1700. However, when the customer places a toll-free telephone call to institution 12, in call-institution step 1732, server 11 connects, in step 2001, the customer's line to operator telephone system 13, which a CSR monitors. In addition, computer 31 records the telephone number of the incoming telephone call via an ANI signal. In addition, computer 31 filters the incoming calls to exclude public telephones, cellular telephones, non-U.S. telephones, blocked telephones, etc. Finally, in receive step 2003, the CSR verbally receives from the customer the control number and the credit card number. Using the control number, the CSR accesses the corresponding one of the online transaction records OT1-OTw. The CSR loads the customer's credit card number into field 1826 and, in decision step 2007, verifies the validity of the originating information (ANI signal) and the information server 11 received in receive-data step 1722. If the data is judged invalid by computer 31 and/or the CSR, he or she informs the customer in inform step 2009 and terminates the process in end step 2011.

If the CSR judges the data to be valid in decision step 2007, the CSR processes the credit, in process-credit step 1740', and then, in read step 1742, reads to the customer a fund-pick-up number that computer 31 randomly generated and placed in field 1814 of the appropriate online transaction record (see FIG. 18). The customer receives the fund-pick-up number, in receive step 1744, and informs the beneficiary of the fund-pick-up number, in inform step 1746.

Although various embodiments which incorporate the teachings of the present invention have been shown and described in detail herein, those skilled in the art can readily devise many other embodiments, modifications and applications of the present invention that still utilize the inventive teachings.

What is claimed is:

1. A method of transferring a sum of money from a customer to a beneficiary via a money-transfer service, an electronic communications network, a network of money dispensing machines and a plurality of distributors of money pick up devices and corresponding PINs (personal identification numbers) capable of selectively operating said money dispensing machines, said method comprising:

accessing by said customer said money-transfer service via said electronic communications network;

transmitting a data-input document from said money-transfer service to said customer via said electronic communications network;

entering by said customer transaction data into said data-input document to record information corresponding to a specific money-transfer transaction between said customer and said beneficiary, said information including an amount of said sum of money to be transferred, an identification of said customer, an identification of said beneficiary, and basic payment data for said money-transfer service to use in collecting said sum of money;

transmitting said transaction data from said customer to said money-transfer service via said electronic communications network;

generating by said money-transfer service a transaction record within a database on a server computer connected to said electronic communication network, the transaction record being associated with the specific money-transfer transaction and including said transaction data;

collecting by said money-transfer service said sum of money in accordance with said basic payment data;

generating by said money-transfer service a unique device pick-up code corresponding to said specific money-transfer transaction, the transaction record associated with the money-transfer transaction including the unique device pick-up code;

providing by said money-transfer service said customer with said unique device pick-up code;

providing by said customer said beneficiary with said unique device pick-up code;

presenting by said beneficiary said unique device pick-up code to one of said plurality of distributors;

accessing by said one distributor said transaction record containing said presented unique device pick-up code via said electronic communication network;

generating by said one distributor a device record within said database via said electronic communication network, said generated device record including data representing an activated money pick-up device and data identifying the sum of money for transfer to the beneficiary as reflected in said transaction record;

generating by said one distributor a PIN associated with the activated money pick-up device, said generated PIN being different than said presented unique device pick-up code and said generated device record including data representing the generated PIN; and providing by said one distributer said activated money pick-up device and said generated PIN to said beneficiary.

2. The method of claim 1 wherein said electronic communications network includes the Internet, and the step of accessing said money-transfer service includes transmitting an access request from said customer to said money-transfer service via said Internet.

3. The method of claim 2 wherein the steps of transmitting said access request and transmitting said data-input document comprise said customer opening a web page provided by said money-transfer service.

4. The method of claim 3 further including said customer having an IP (Internet Protocol) address and said money-transfer service recording said IP address in response to said customer accessing said money-transfer service.

5. The method of claim 4 further including said money-transfer service creating a transaction record including said IP address, said transaction data and said unique fund-pick-up code.

6. The method of claim 4 further including said money-transfer service transmitting a transaction confirmation request to said customer via said Internet.

7. The method of claim 6 wherein said electronic communications network includes the PSTN (Public Switched Telephone Network), and further including said customer contacting said money-transfer service via said PSTN to obtain said unique fund-pick-up code.

8. The method of claim 7 wherein the step of said customer contacting said money-transfer service via said PSTN includes said customer informing said money-transfer service of additional payment data.

9. The method of claim 8 wherein said basic payment data includes an identification of a customer account at a payment institution, and the step of informing said money-transfer service of additional payment data includes revealing a unique payment code associated with said customer account.

10. The method of claim 9 wherein the step of contacting said money-transfer service includes said customer communicating with an operator via said PSTN.

11. The method of claim 7 wherein the step of said customer entering data includes entering additional payment data.

12. The method of claim 11 wherein said basic payment data includes an identification of a customer account at a payment institution, and the step of entering additional payment data includes entering a unique payment code associated with said customer.

13. The method of claim 1, comprising said beneficiary using said unique fund-pick-up code to acquire a financial instrument representing said transferred sum of money.

14. The method of claim 1, comprising said customer entering into said data input document a currency type used by said customer and a currency type used by said beneficiary.

15. A method of transferring a sum of money from a customer to a beneficiary via the Internet, an online money-transfer service, a network of money dispensing machines and a plurality of distributors of money pick up devices and corresponding PINs (personal identification numbers) capable of selectively operating said money dispensing machines, said method comprising:

accessing by said customer said money-transfer service via said Internet and an Internet-access device;

transmitting a data-input document from said online money-transfer service to said customer via said Internet;

opening said data-input document on said Internet-access device;

entering by said customer transaction data into said data input document to record information corresponding to a specific money-transfer transaction between said customer and said beneficiary, said information including an amount of said sum of money to be transferred, an identification of said customer, an identification of said beneficiary, and basic payment data for said online money-transfer service to use in collecting said sum of money;

transmitting said transaction data from said Internet-access device to said online money-transfer service via said Internet;

generating by said money-transfer service a transaction record within a database on a server computer connected to said Internet, the transaction record being associated with the specific money-transfer transaction and including said transaction data;

collecting by said money-transfer service said sum of money in accordance with said basic payment data;

generating by said money-transfer service a unique device pick-up code corresponding to said specific money-transfer transaction, the transaction record associated with the money-transfer transaction including the unique device pick-up code;

providing by said money-transfer service said customer with said unique device pick-up code;

providing by said customer said beneficiary with said unique device pick-up code;

presenting by said beneficiary said unique device pick-up code to one of said plurality of distributors;

accessing by said one distributor said transaction record containing said presented unique device pick-up code via said Internet;

generating by said one distributor a device record within said database via said Internet, said generated device record including data representing an activated money pick-up device and data identifying the sum of money for transfer to the beneficiary as reflected in said transaction record;

generating by said one distributor a PIN associated with the activated money pick-up device, said generated PIN being different than said presented unique device pick-up code and said generated device record including data representing the generated PIN; and providing by said one distributer said activated money pick-up device and said generated PIN to said beneficiary.

16. The method of claim 15 further including said Internet-access device having an IP (Internet Protocol) address and said online money-transfer service recording said IP address.

17. The method of claim 16 further including said online money-transfer service transmitting a transaction confirmation request to said Internet-access device via said Internet.

18. The method of claim 17 further including said online money-transfer service and said customer connected to the PSTN (Public Switched Telephone Network) having an ANI (automatic number identification) service for transmitting an ANI signal to a called party, and further including said customer placing a telephone call to said online money-transfer service via said PSTN to obtain said unique fund-pick-up code.

19. The method of claim 18 wherein said transaction data includes the customer's telephone number, and the step of said customer placing a telephone call to said online money-transfer service includes said online money-transfer service looking for a match between said ANI signal and said customer's telephone number, and said online money-transfer service informing said customer of said unique fund-pick-up code.

20. The method of claim 19 wherein the step of said customer placing a telephone call to said online money-transfer service includes said customer informing said online money-transfer service of additional payment data for use with said basic payment data in the step of collecting said sum of money.

21. The method of claim 20 wherein said basic payment data includes an identification of a customer account at a payment institution, and the step of informing said online money-transfer service of additional payment data includes revealing a unique payment code associated with said customer account.

22. The method of claim 21 wherein the step of placing a telephone call to said online money-transfer service includes said customer verbally communicating with an operator via said PSTN.

23. The method of claim 19 wherein the step of said customer entering transaction data includes entering additional payment data for use with said basic payment data in the step of collecting said sum of money, and wherein said basic payment data includes an identification of a customer account at a payment institution and said additional payment data includes a unique payment code associated with said customer account.

* * * * *